US012374343B2

(12) United States Patent
Sugiura et al.

(10) Patent No.: US 12,374,343 B2
(45) Date of Patent: Jul. 29, 2025

(54) SOUND SIGNAL ENCODING METHOD, SOUND SIGNAL DECODING METHOD, SOUND SIGNAL ENCODING APPARATUS, SOUND SIGNAL DECODING APPARATUS, PROGRAM, AND RECORDING MEDIUM

(71) Applicant: NIPPON TELEGRAPH AND TELEPHONE CORPORATION, Tokyo (JP)

(72) Inventors: Ryosuke Sugiura, Tokyo (JP); Takehiro Moriya, Tokyo (JP); Yutaka Kamamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 424 days.

(21) Appl. No.: 17/908,955

(22) PCT Filed: Mar. 9, 2020

(86) PCT No.: PCT/JP2020/010081

§ 371 (c)(1),
(2) Date: Sep. 2, 2022

(87) PCT Pub. No.: WO2021/181473

PCT Pub. Date: Sep. 16, 2021

(65) Prior Publication Data

US 2023/0086460 A1 Mar. 23, 2023

(51) Int. Cl.
*G10L 19/008* (2013.01)

(52) U.S. Cl.
CPC .................................. *G10L 19/008* (2013.01)

(58) Field of Classification Search
CPC ..... G10L 19/008; H04S 1/007; H04S 2400/03
See application file for complete search history.

(56) References Cited

U.S. PATENT DOCUMENTS 8,200,351 B2 * 6/2012 Kurniawati ............. H04S 1/007 381/104
12,119,009 B2 * 10/2024 Sugiura ...................... H04S 7/30
12,165,659 B2 * 12/2024 Sugiura ................... G10L 19/24
2006/0009225 A1 * 1/2006 Herre .................... G10L 19/008 455/450

(Continued)

FOREIGN PATENT DOCUMENTS

WO WO-2006070751 A1 * 7/2006 ........... G10L 19/008

*Primary Examiner* — Oyesola C Ojo

(57) ABSTRACT

A downmix unit 110 obtains downmix signals which are signals obtained by mixing input sound signals of a left channel input and input sound signals of a right channel input. In a case where the left channel is preceding, the downmix signals are determined to be used as is in a left channel subtraction gain estimation unit 120 and a left channel signal subtraction unit 130, and delayed downmix signals are determined to be used in a right channel subtraction gain estimation unit 140 and a right channel signal subtraction unit 150. In a case where the right channel is preceding, the downmix signals are determined to be used as is in the right channel subtraction gain estimation unit 140 and the right channel signal subtraction unit 150, and delayed downmix signals are determined to be used in the left channel subtraction gain estimation unit 120 and the left channel signal subtraction unit 130.

10 Claims, 15 Drawing Sheets

(56) References Cited

U.S. PATENT DOCUMENTS

| | | | | |
|---|---|---|---|---|
| 2008/0010072 A1* | 1/2008 | Yoshida | G10L 19/008 | 704/E19.044 |
| 2016/0154880 A1* | 6/2016 | Hoarty | G06F 16/683 | 707/770 |
| 2022/0199098 A1* | 6/2022 | Ashour | G06F 17/141 | |

* cited by examiner

SOUND SIGNAL ENCODING METHOD, SOUND SIGNAL DECODING METHOD, SOUND SIGNAL ENCODING APPARATUS, SOUND SIGNAL DECODING APPARATUS, PROGRAM, AND RECORDING MEDIUM

CROSS-REFERENCE TO RELATED APPLICATIONS

This application is a U.S. National Stage Application filed under 35 U.S.C. § 371 claiming priority to International Patent Application No. PCT/JP2020/010081, filed on 9 Mar. 2020, the disclosure of which is hereby incorporated herein by reference in its entirety.

TECHNICAL FIELD

The present disclosure relates to a technique for embedded coding/decoding 2-channel sound signals.

BACKGROUND ART

The technique of PTL 1 is a technique for embedded coding/decoding 2-channel sound signals and monaural sound signals. PTL 1 discloses a technique for obtaining monaural signals obtained by adding sound signals of the left channel input and sound signals of the right channel input, coding the monaural signals (monaural coding) to obtain a monaural code, decoding the monaural code (monaural decoding) to obtain monaural local decoded signals, and coding the difference (prediction residue signals) between the input sound signals and prediction signals obtained from the monaural local decoded signals for each of the left channel and the right channel. In the technique of PTL 1, for each channel, assuming that signals obtained by giving a latency and an amplitude ratio to monaural local decoded signals are prediction signals, prediction residue signals are obtained by subtracting the prediction signals from the input sound signals, by selecting prediction signals having a latency and an amplitude ratio that minimize the errors between the input sound signals and the prediction signals, or by using prediction signals having a latency difference and an amplitude ratio that maximize the cross-correlation between the input sound signals and the monaural local decoded signals. By targeting the prediction residue signals for coding/decoding, the deterioration of the sound quality of the decoded sound signals of each channel is suppressed.

CITATION LIST

Patent Literature

PTL 1: WO 2006/070751

SUMMARY OF THE INVENTION

Technical Problem

In the technique of PTL 1, even in a case where the correlation between the channel signals of the input sound signals is small, the sound signals can be efficiently coded. However, in the technique of PTL 1, there is a problem that the arithmetic processing amount or the code amount are redundant, for example, in a use case that is mainly expected in telephone conferences or the like, that is, in a use case in which 2-channel sound signals obtained by collecting sound emitted by one sound source in a space, by two microphones disposed in the space are the target of coding.

An object of the present disclosure is to provide embedded coding/decoding for 2-channel sound signals in which deterioration of sound quality of decoded sound signals of each channel is suppressed, with less arithmetic processing amount and code amount than before, such as in a case where the 2-channel sound signals are sound signals obtained by collecting sound emitted by one sound source in a space, by two microphones disposed in the space.

Means for Solving the Problem

One aspect of the present disclosure is a sound signal coding method for coding an input sound signal on a frame-by-frame basis, the sound signal coding method including obtaining a downmix signal that is a signal obtained by mixing a left channel input sound signal that is input and a right channel input sound signal that is input, obtaining a monaural code CM by coding the downmix signal, obtaining a left-right time difference $\tau$ and a left-right time difference code $C\tau$ that is a code representing the left-right time difference $\tau$, from the left channel input sound signal and the right channel input sound signal, determining including, in a case where the left-right time difference $\tau$ indicates that a left channel is preceding, deciding to use the downmix signal as is in obtaining of a left channel subtraction gain $\alpha$ and a left channel subtraction gain code $C\alpha$ and obtaining of a sequence of values as a left channel difference signal, and deciding to use a delayed downmix signal that is a signal obtained by delaying the downmix signal by a magnitude represented by the left-right time difference $\tau$ in obtaining of a right channel subtraction gain $\beta$ and a right channel subtraction gain code $C\beta$ and obtaining of a sequence of values as a right channel difference signal, in a case where the left-right time difference $\tau$ indicates that a right channel is preceding, deciding to use the downmix signal as is in the obtaining of the right channel subtraction gain $\beta$ and the right channel subtraction gain code $C\beta$ and the obtaining of the sequence of values as the right channel difference signal, and deciding to use a delayed downmix signal that is a signal obtained by delaying the downmix signal by a magnitude represented by the left-right time difference $\tau$ in the obtaining of the left channel subtraction gain $\alpha$ and the left channel subtraction gain code $C\alpha$ and the obtaining of the sequence of values as the left channel difference signal, and in a case where the left-right time difference $\tau$ indicates that neither the left channel nor the right channel is preceding, deciding to use the downmix signal as is in the obtaining of the left channel subtraction gain $\alpha$ and the left channel subtraction gain code $C\alpha$, the obtaining of the sequence of values as the left channel difference signal, the obtaining of the right channel subtraction gain $\beta$ and the right channel subtraction gain code $C\beta$, and the obtaining of the sequence of values as the right channel difference signal, the obtaining the left channel subtraction gain $\alpha$ and the left channel subtraction gain code $C\alpha$ that is a code representing the left channel subtraction gain $\alpha$, from the left channel input sound signal, and the downmix signal or the delayed downmix signal decided by the determining, the obtaining the sequence of values obtained by subtracting a value obtained by multiplying a sample value of the downmix signal or the delayed downmix signal decided by the determining and the left channel subtraction gain $\alpha$, from a sample value of the left channel input sound signal, per corresponding sample t, as the left channel difference signal, the obtaining the right channel subtraction gain β and the right channel subtraction gain code Cβ that is a code representing the right channel subtraction gain β, from the right channel input sound signal, and the downmix signal or the delayed downmix signal decided by the determining, the obtaining the sequence of values obtained by subtracting a value obtained by multiplying a sample value of the downmix signal or the delayed downmix signal decided by the determining and the right channel subtraction gain β, from a sample value of the right channel input sound signal, per corresponding sample t, as the right channel difference signal, and obtaining a stereo code CS by coding the left channel difference signal and the right channel difference signal.

One aspect of the present disclosure is a sound signal coding method for coding an input sound signal on a frame-by-frame basis, the sound signal coding method including obtaining a downmix signal that is a signal obtained by mixing a left channel input sound signal that is input and a right channel input sound signal that is input, obtaining a monaural code CM and a quantized downmix signal by coding the downmix signal, obtaining a left-right time difference τ and a left-right time difference code Cτ that is a code representing the left-right time difference τ, from the left channel input sound signal and the right channel input sound signal, determining including, in a case where the left-right time difference τ indicates that a left channel is preceding, deciding to use the quantized downmix signal as is in obtaining of a left channel subtraction gain α and a left channel subtraction gain code Cα and obtaining of a sequence of values as a left channel difference signal, and deciding to use a delayed quantized downmix signal that is a signal obtained by delaying the quantized downmix signal by a magnitude represented by the left-right time difference τ in obtaining of a right channel subtraction gain β and a right channel subtraction gain code Cβ and obtaining of a sequence of values as a right channel difference signal, in a case where the left-right time difference τ indicates that a right channel is preceding, deciding to use the quantized downmix signal as is in the obtaining of the right channel subtraction gain β and the right channel subtraction gain code Cβ and the obtaining of the sequence of values as the right channel difference signal, and deciding to use a delayed quantized downmix signal that is a signal obtained by delaying the quantized downmix signal by a magnitude represented by the left-right time difference τ in the obtaining of the left channel subtraction gain α and the left channel subtraction gain code Cα and the obtaining of the sequence of values as the left channel difference signal, and in a case where the left-right time difference τ indicates that neither the left channel nor the right channel is preceding, deciding to use the quantized downmix signal as is in the obtaining of the left channel subtraction gain α and the left channel subtraction gain code Cα, the obtaining of the sequence of values as the left channel difference signal, the obtaining of the right channel subtraction gain β and the right channel subtraction gain code Cβ, and the obtaining of the sequence of values as the right channel difference signal, the obtaining the left channel subtraction gain α and the left channel subtraction gain code Cα that is a code representing the left channel subtraction gain α, from the left channel input sound signal, and the quantized downmix signal or the delayed quantized downmix signal decided by the determining, the obtaining the sequence of values obtained by subtracting a value obtained by multiplying a sample value of the quantized downmix signal or the delayed quantized downmix signal decided by the determining and the left channel subtraction gain α, from a sample value of the left channel input sound signal, per corresponding sample t, as the left channel difference signal, the obtaining the right channel subtraction gain β and the right channel subtraction gain code Cβ that is a code representing the right channel subtraction gain β, from the right channel input sound signal, and the quantized downmix signal or the delayed quantized downmix signal decided by the determining, the obtaining the sequence of values obtained by subtracting a value obtained by multiplying a sample value of the quantized downmix signal or the delayed quantized downmix signal decided by the determining and the right channel subtraction gain β, from a sample value of the right channel input sound signal, per corresponding sample t, as the right channel difference signal, and obtaining a stereo code CS by coding the left channel difference signal and the right channel difference signal.

One aspect of the present disclosure is a sound signal decoding method for obtaining a sound signal by decoding an input code on a frame-by-frame basis, the sound signal decoding method including obtaining a monaural decoded sound signal by decoding a monaural code CM that is input, obtaining a left channel decoded difference signal and a right channel decoded difference signal by decoding a stereo code CS that is input, obtaining a left-right time difference τ from a left-right time difference code Cτ that is input, determining including, in a case where the left-right time difference indicates that a left channel is preceding, deciding to use the monaural decoded sound signal as is in obtaining of a sequence of values as a left channel decoded sound signal, and deciding to use a delayed monaural decoded sound signal that is a signal obtained by delaying the monaural decoded sound signal by a magnitude represented by the left-right time difference τ in obtaining of a sequence of values as a right channel decoded sound signal, in a case where the left-right time difference τ indicates that a right channel is preceding, deciding to use the monaural decoded sound signal as is in the obtaining of the sequence of values as the right channel decoded sound signal, and deciding to use a delayed monaural decoded sound signal that is a signal obtained by delaying the monaural decoded sound signal by a magnitude represented by the left-right time difference τ in the obtaining of the sequence of values as the left channel decoded sound signal, and in a case where the left-right time difference τ indicates that neither the left channel nor the right channel is preceding, deciding to use the monaural decoded sound signal as is in the obtaining of the sequence of values as the left channel decoded sound signal and the obtaining of the sequence of values as the right channel decoded sound signal, obtaining a left channel subtraction gain α by decoding a left channel subtraction gain code Cα that is input, the obtaining the sequence of values obtained by adding a sample value of the left channel decoded difference signal and a value obtained by multiplying a sample value of the monaural decoded sound signal or the delayed monaural decoded sound signal decided by the determining and the left channel subtraction gain α, per corresponding sample t, as the left channel decoded sound signal, obtaining a right channel subtraction gain β by decoding a right channel subtraction gain code Cβ that is input, and the obtaining the sequence of values obtained by adding a sample value of the right channel decoded difference signal and a value obtained by multiplying a sample value of the monaural decoded sound signal or the delayed monaural decoded sound signal decided by the determining and the right channel subtraction gain β, per corresponding sample t, as the right channel decoded sound signal.

Effects of the Invention

According to the present disclosure, it is possible to provide embedded coding/decoding for 2-channel sound signals in which deterioration of sound quality of decoded sound signals of each channel is suppressed, with less arithmetic processing amount and code amount than before, such as in a case where the 2-channel sound signals are sound signals obtained by collecting sound emitted by one sound source in a space, by two microphones disposed in the space.

DESCRIPTION OF EMBODIMENTS

Reference Embodiment

Prior to describing embodiments of the disclosure, a coding device and a decoding device in an original form for carrying out the disclosure will be described as a reference embodiment. Note that, in the specification and the claims, a coding device may be referred to as a sound signal coding device, a coding method may be referred to as a sound signal coding method, a decoding device may be referred to as a sound signal decoding device, and a decoding method may be referred to as a sound signal decoding method.

Coding Device 100

Figure 1:
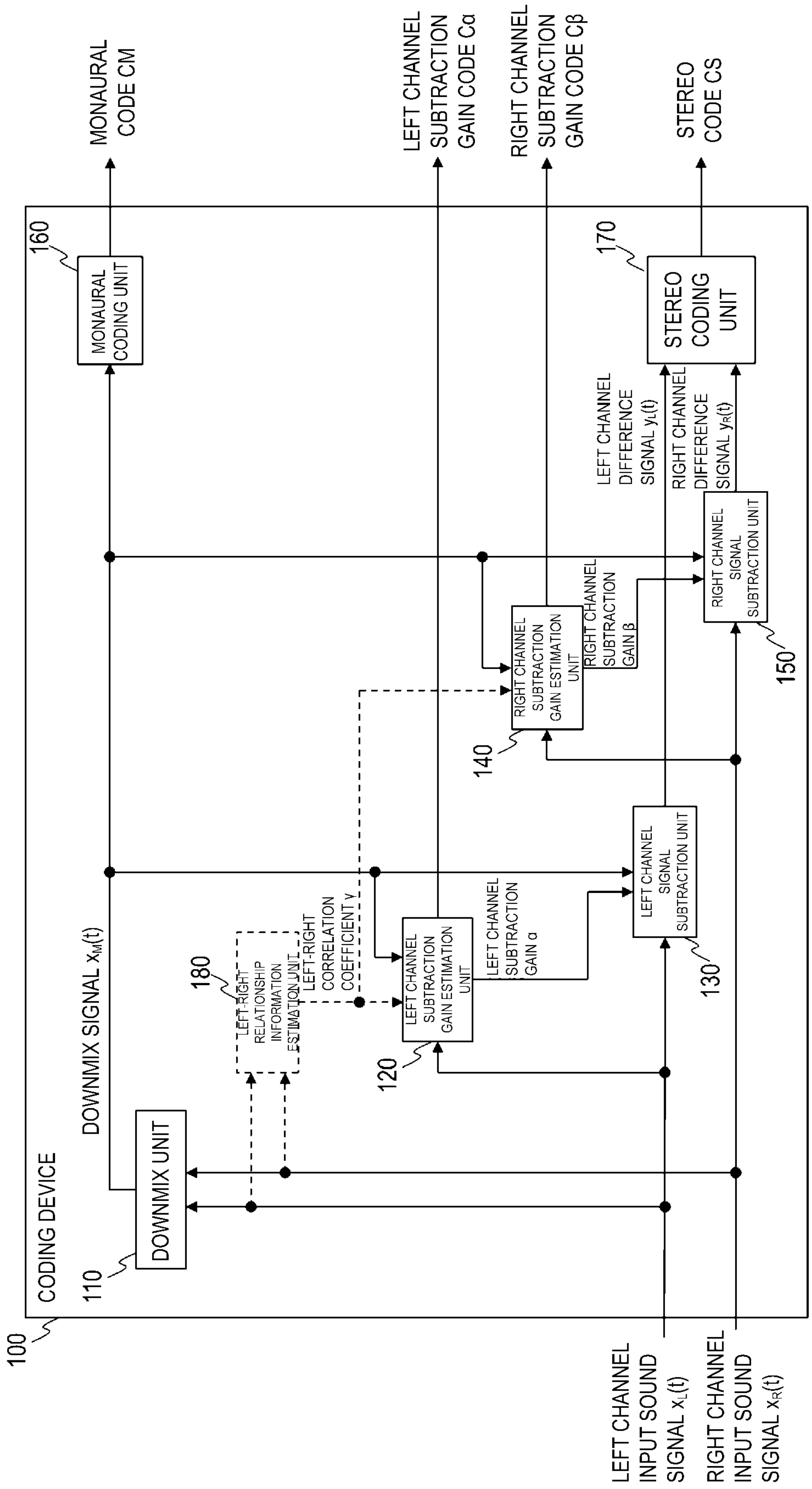
FIG. 1 is a block diagram illustrating an example of a coding device according to a reference embodiment.
Figure 2:
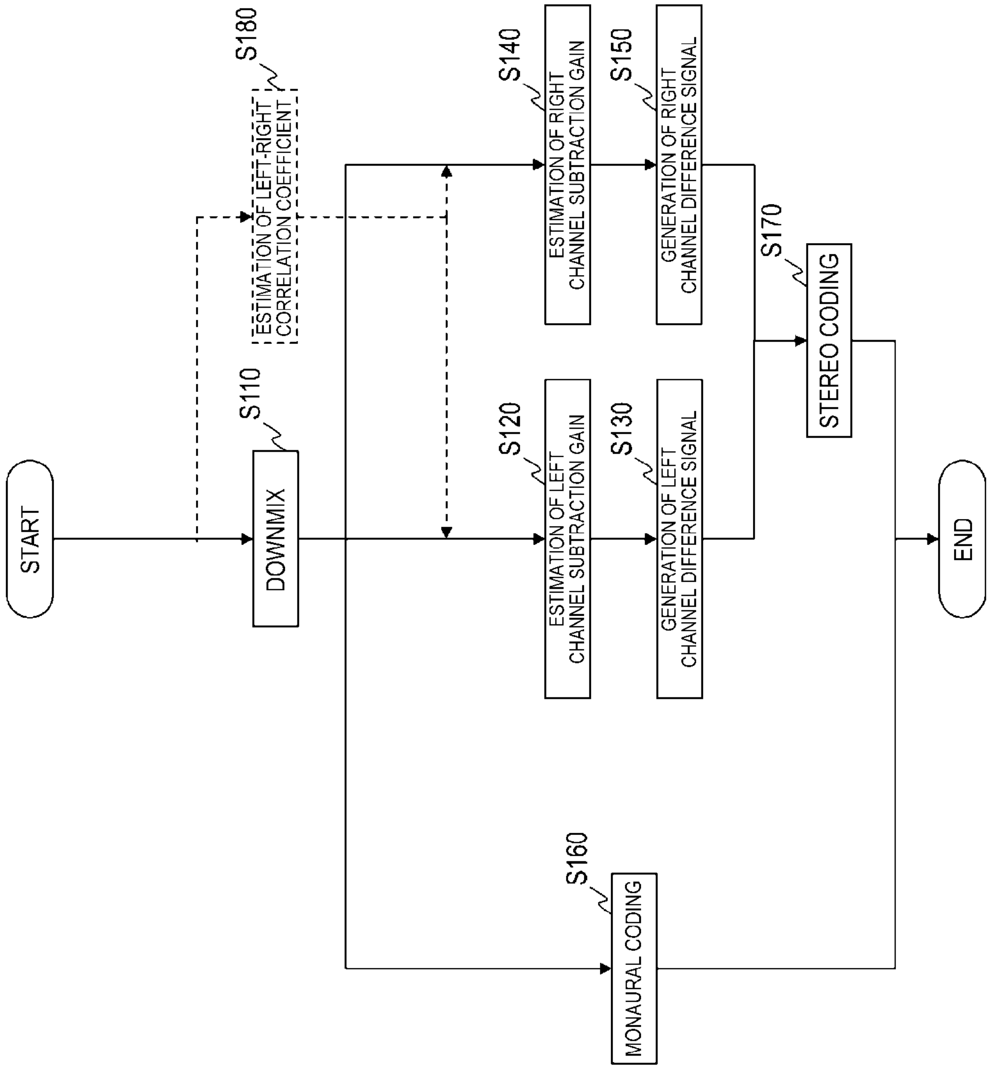
FIG. 2 is a flowchart illustrating an example of processing of the coding device according to the reference embodiment.

As illustrated in FIG. 1, the coding device 100 according to the reference embodiment includes a downmix unit 110, a left channel subtraction gain estimation unit 120, a left channel signal subtraction unit 130, a right channel subtraction gain estimation unit 140, a right channel signal subtraction unit 150, a monaural coding unit 160, and a stereo coding unit 170. The coding device 100 codes input 2-channel stereo sound signals in the time domain in frame units having a prescribed time length of, for example, 20 ms, to obtain and output the monaural code CM, the left channel subtraction gain code Cα, the right channel subtraction gain code Cβ, and the stereo code CS described later. The 2-channel stereo sound signals in the time domain input to the coding device are, for example, digital audio signals or acoustic signals obtained by collecting sounds such as voice and music with each of two microphones and performing AD conversion, and consist of input sound signals of the left channel and input sound signals of the right channel. The codes output by the coding device, that is, the monaural code CM, the left channel subtraction gain code Cα, the right channel subtraction gain code Cβ, and the stereo code CS are input to the decoding device. The coding device 100 performs the processes of steps S110 to S170 illustrated in FIG. 2 for each frame.

Downmix Unit 110

The input sound signals of the left channel input to the coding device 100 and the input sound signals of the right channel input to the coding device 100 are input to the downmix unit 110. The downmix unit 110 obtains and outputs downmix signals which are signals obtained by mixing the input sound signals of the left channel and the input sound signals of the right channel, from the input sound signals of the left channel and the input sound signals of the right channel input (step S110).

For example, assuming that the number of samples per frame is T, input sound signals $x_L(1), x_L(2), \ldots, x_L(T)$ of the left channel and input sound signals $x_R(1), x_R(2), \ldots, x_R(T)$ of the right channel input to the coding device 100 in frame units are input to the downmix unit 110. Here, T is a positive integer, and, for example, if the frame length is 20 ms and the sampling frequency is 32 kHz, then T is 640. The downmix unit 110 obtains and outputs a sequence of average values of the respective sample values for corresponding samples of the input sound signals of the left channel and the input sound signals of the right channel input, as downmix signals $x_M(1), x_M(2), \ldots, x_M(T)$. In other words, assuming t for each sample number, $x_M(t)=(x_L(t)+x_R(t))/2$.

Left Channel Subtraction Gain Estimation Unit 120

The input sound signals $x_L(1), x_L(2), \ldots, x_L(T)$ of the left channel input to the coding device 100, and the downmix signals $x_M(1), x_M(2), \ldots, x_M(T)$ output by the downmix unit 110 are input to the left channel subtraction gain estimation unit 120. The left channel subtraction gain estimation unit 120 obtains and outputs the left channel subtraction gain α and the left channel subtraction gain code Cα, which is the code representing the left channel subtraction gain α, from the input sound signals of the left channel and the downmix signals input (step S120). The left channel subtraction gain estimation unit 120 determines the left channel subtraction gain $\alpha$ and the left channel subtraction gain code $C\alpha$ by a well-known method such as that illustrated in the method of obtaining the amplitude ratio g in PTL 1 or the method of coding the amplitude ratio g, or a newly proposed method based on the principle for minimizing quantization errors. The principle for minimizing quantization errors and the method based on this principle are described below.

Left Channel Signal Subtraction Unit 130

The input sound signals $x_L(1), x_L(2), \ldots, x_L(T)$ of the left channel input to the coding device 100, the downmix signals $x_M(1), x_M(2), \ldots, x_M(T)$ output by the downmix unit 110, and the left channel subtraction gain $\alpha$ output by the left channel subtraction gain estimation unit 120 are input to the left channel signal subtraction unit 130. The left channel signal subtraction unit 130 obtains and outputs a sequence of values $x_L(t)-\alpha\times x_M(t)$ obtained by subtracting the value $\alpha\times x_M(t)$, obtained by multiplying the sample value $x_M(t)$ of the downmix signal and the left channel subtraction gain $\alpha$, from the sample value $x_L(t)$ of the input sound signal of the left channel, for each corresponding sample t, as left channel difference signals $y_L(1), y_L(2), \ldots, y_L(T)$ (step S130). In other words, $y_L(t)=x_L(t)-\alpha\times x_M(t)$. In the coding device 100, in order to avoid requiring latency or an arithmetic processing amount for obtaining a local decoded signal, the left channel signal subtraction unit 130 may use the unquantized downmix signal $x_M(t)$ obtained by the downmix unit 110 rather than a quantized downmix signal that is a local decoded signal of monaural coding. However, in a case where the left channel subtraction gain estimation unit 120 obtains the left channel subtraction gain $\alpha$ in a well-known method such as that illustrated in PTL 1 rather than the method based on the principle for minimizing quantization errors, a means for obtaining a local decoded signal corresponding to the monaural code CM may be provided in the subsequent stage of the monaural coding unit 160 of the coding device 100 or in the monaural coding unit 160, and in the left channel signal subtraction unit 130, quantized downmix signals $\hat{x}_M(1), \hat{x}_M(2), \ldots, \hat{x}_M(T)$ which are local decoded signals for monaural coding may be used to obtain the left channel difference signals in place of the downmix signals $x_M(1), x_M(2), \ldots, x_M(T)$, as in the case of a conventional coding device such as PTL 1.

Right Channel Subtraction Gain Estimation Unit 140

The input sound signals $x_R(1), x_R(2), \ldots, x_R(T)$ of the right channel input to the coding device 100, and the downmix signals $x_M(1), x_M(2), \ldots, x_M(T)$ output by the downmix unit 110 are input to the right channel subtraction gain estimation unit 140. The right channel subtraction gain estimation unit 140 obtains and outputs the right channel subtraction gain $\beta$ and the right channel subtraction gain code $C\beta$, which is the code representing the right channel subtraction gain $\beta$, from the input sound signals of the right channel and the downmix signals input (step S140). The right channel subtraction gain estimation unit 140 determines the right channel subtraction gain $\beta$ and the right channel subtraction gain code $C\beta$ by a well-known method such as that illustrated in the method of obtaining the amplitude ratio g in PTL 1 or the method of coding the amplitude ratio g, or a newly proposed method based on the principle for minimizing quantization errors. The principle for minimizing quantization errors and the method based on this principle are described below.

Right Channel Signal Subtraction Unit 150

The input sound signals $x_R(1), x_R(2), \ldots, x_R(T)$ of the right channel input to the coding device 100, the downmix signals $x_M(1), x_M(2), \ldots, x_M(T)$ output by the downmix unit 110, and the right channel subtraction gain $\beta$ output by the right channel subtraction gain estimation unit 140 are input to the right channel signal subtraction unit 150. The right channel signal subtraction unit 150 obtains and outputs a sequence of values $x_R(t)-\beta\times x_M(t)$ obtained by subtracting the value $\beta\times x_M(t)$, obtained by multiplying the sample value $x_M(t)$ of the downmix signal and the right channel subtraction gain $\beta$, from the sample value $x_R(t)$ of the input sound signal of the right channel, for each corresponding sample t, as right channel difference signals $y_R(1), y_R(2), \ldots, y_R(T)$ (step S150). In other words, $y_R(t)=x_R(t)-\beta\times x_M(t)$. Similar to the left channel signal subtraction unit 130, in the coding device 100, in order to avoid requiring latency or an arithmetic processing amount for obtaining a local decoded signal, the right channel signal subtraction unit 150 only needs to use the unquantized downmix signal $x_M(t)$ obtained by the downmix unit 110 rather than a quantized downmix signal that is a local decoded signal of monaural coding. However, in a case where the right channel subtraction gain estimation unit 140 obtains the right channel subtraction gain $\beta$ in a well-known method such as that illustrated in PTL 1 rather than the method based on the principle for minimizing quantization errors, a means for obtaining a local decoded signal corresponding to the monaural code CM may be provided in the subsequent stage of the monaural coding unit 160 of the coding device 100 or in the monaural coding unit 160, and in the right channel signal subtraction unit 150, similar to the left channel signal subtraction unit 130, quantized downmix signals $\hat{x}_M(1), \hat{x}_M(2), \ldots, \hat{x}_M(T)$ which are local decoded signals for monaural coding may be used to obtain the right channel difference signals in place of the downmix signals $x_M(1), x_M(2), \ldots, x_M(T)$, as in the case of a conventional coding device such as PTL 1.

Monaural Coding Unit 160

The downmix signals $x_M(1), x_M(2), \ldots, x_M(T)$ output by the downmix unit 110 are input to the monaural coding unit 160. The monaural coding unit 160 codes the input downmix signals with $b_M$ bits in a prescribed coding scheme to obtain and output the monaural code CM (step S160). In other words, the monaural code CM with $b_M$ bits is obtained and output from the downmix signals $x_M(1), x_M(2), \ldots, x_M(T)$ of the input T samples. Any coding scheme may be used as the coding scheme, for example, a coding scheme such as the 3GPP EVS standard is used.

Stereo Coding Unit 170

The left channel difference signals $y_L(1), y_L(2), \ldots, y_L(T)$ output by the left channel signal subtraction unit 130, and the right channel difference signals $y_R(1), y_R(2), \ldots, y_R(T)$ output by the right channel signal subtraction unit 150 are input to the stereo coding unit 170. The stereo coding unit 170 codes the input left channel difference signals and the right channel difference signals in a prescribed coding scheme with a total of $b_s$ bits to obtain and output the stereo code CS (step S170). In other words, the stereo code CS with the total of $b_S$ bits are obtained from the left channel difference signals $y_L(1), y_L(2), \ldots, y_L(T)$ of the input T samples and the right channel difference signals $y_R(1), y_R(2), \ldots, y_R(T)$ of the input T samples, and output. Any coding scheme may be used as the coding scheme, for example, a stereo coding scheme corresponding to the stereo decoding scheme of the MPEG-4 AAC standard may be used, or a coding scheme of independently coding input left channel difference signals and input right channel difference signals may be used, and a combination of all the codes obtained by the coding is used as a "stereo code CS".

In a case where the input left channel difference signals and the input right channel difference signals are coded independently, the stereo coding unit 170 codes the left channel difference signals with $b_L$ bits and codes the right channel difference signals with $b_R$ bits. In other words, the stereo coding unit 170 obtains the left channel difference code CL with $b_L$ bits from the left channel difference signals $y_L(1), y_L(2), \ldots, y_L(T)$ of the input T samples, obtains the right channel difference code CR with $b_R$ bits from the right channel difference signals $y_R(1), y_R(2), \ldots, y_R(T)$ of the input T samples, and outputs the combination of the left channel difference code CL and the right channel difference code CR as the stereo code CS. Here, the sum of $b_L$ bits and $b_R$ bits is $b_S$ bits.

In a case where the input left channel difference signals and the right channel difference signals are coded together in one coding scheme, the stereo coding unit 170 codes the left channel difference signals and the right channel difference signals with a total of $b_S$ bit. In other words, the stereo coding unit 170 obtains and outputs the stereo code CS with $b_S$ bits from the left channel difference signals $y_L(1), y_L(2), \ldots, y_L(T)$ of the input T samples and the right channel difference signals $y_R(1), y_R(2), \ldots, y_R(T)$ of the input T samples.

Decoding Device 200

Figure 3:
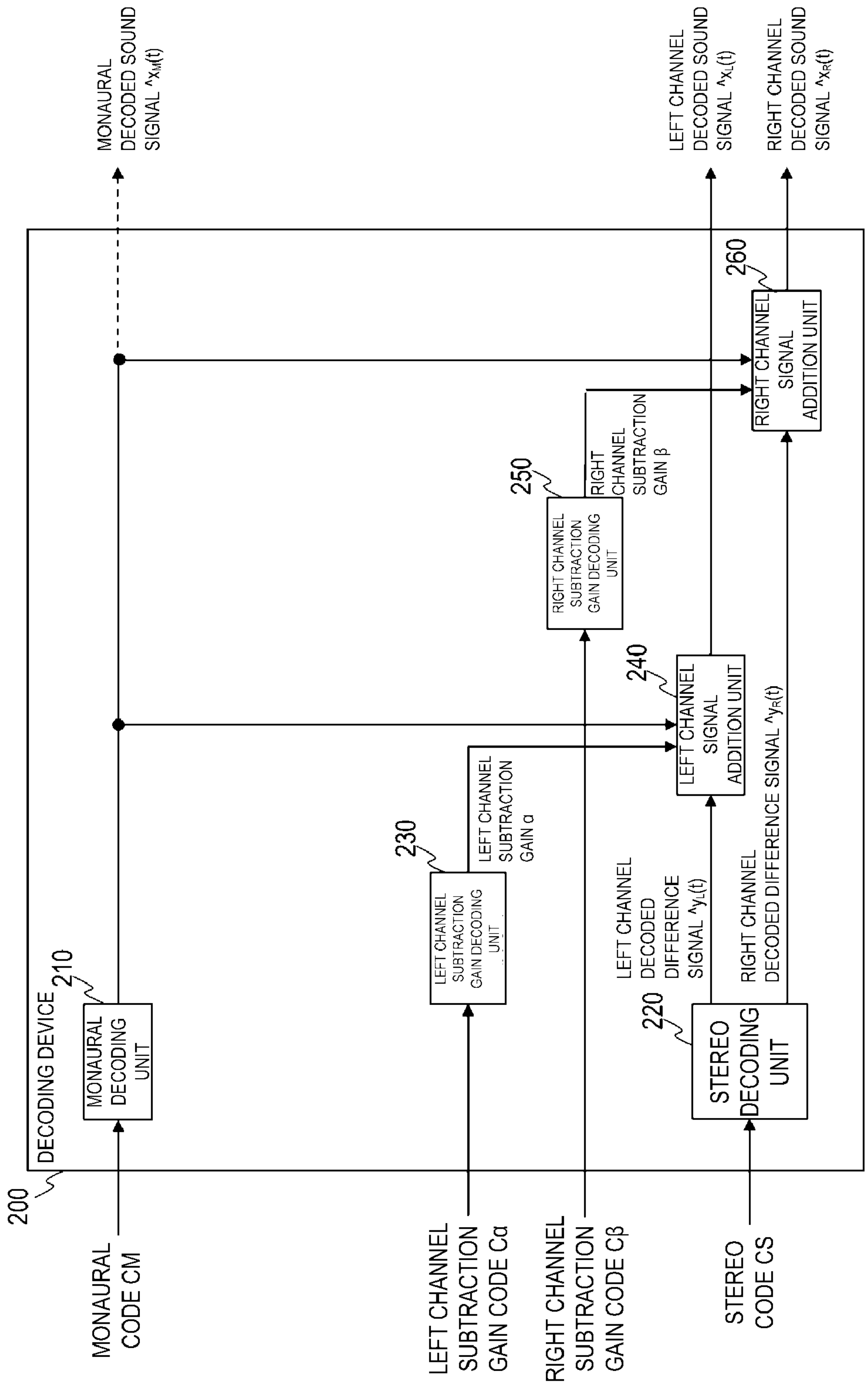
FIG. 3 is a block diagram illustrating an example of a decoding device according to the reference embodiment.
Figure 4:
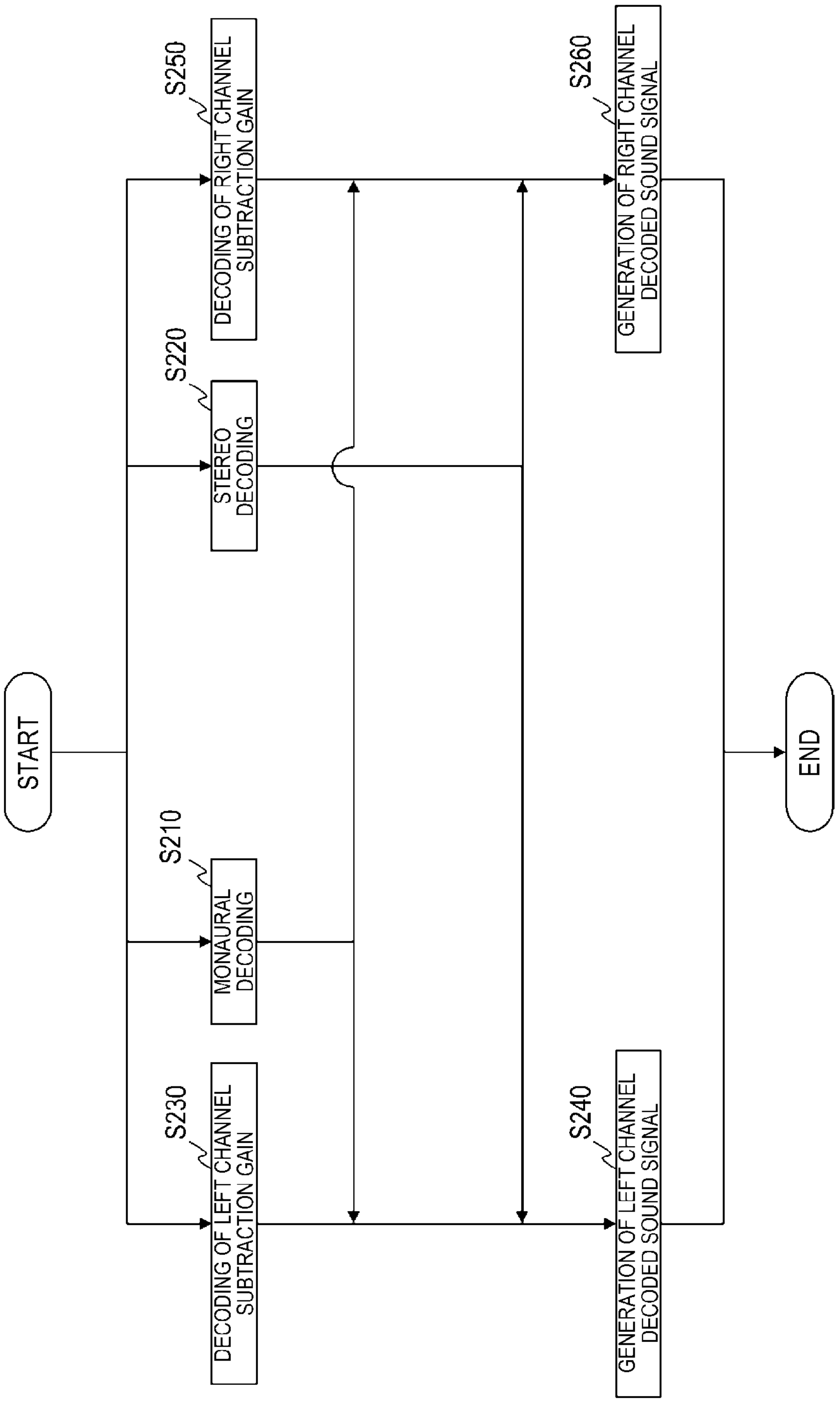
FIG. 4 is a flowchart illustrating an example of processing of the decoding device according to the reference embodiment.

As illustrated in FIG. 3, the decoding device 200 according to the reference embodiment includes a monaural decoding unit 210, a stereo decoding unit 220, a left channel subtraction gain decoding unit 230, a left channel signal addition unit 240, a right channel subtraction gain decoding unit 250, and a right channel signal addition unit 260. The decoding device 200 decodes the input monaural code CM, the left channel subtraction gain code Cα, the right channel subtraction gain code Cβ, and the stereo code CS in the frame units having the same time length as that of the corresponding coding device 100, to obtain and output 2-channel stereo decoded sound signals (left channel decoded sound signals and right channel decoded sound signals described below) in the time domain in frame units. The decoding device 200 may also output monaural decoded sound signals (monaural decoded sound signals described below) in the time domain, as indicated by the dashed lines in FIG. 3. The decoded sound signals output by the decoding device 200 are, for example, DA converted and played by a speaker to be heard. The decoding device 200 performs the processes of steps S210 to S260 illustrated in FIG. 4 for each frame.

Monaural Decoding Unit 210

The monaural code CM input to the decoding device 200 is input to the monaural decoding unit 210. The monaural decoding unit 210 decodes the input monaural code CM in a prescribed decoding scheme to obtain and output monaural decoded sound signals $\hat{x}_M(1), \hat{x}_M(2), \ldots, \hat{x}_M(T)$ (step S210). A decoding scheme corresponding to the coding scheme used by the monaural coding unit 160 of the corresponding coding device 100 is used as the prescribed decoding scheme. The number of bits of the monaural code CM is $b_M$.

Stereo Decoding Unit 220

The stereo code CS input to the decoding device 200 is input to the stereo decoding unit 220. The stereo decoding unit 220 decodes the input stereo code CS in a prescribed decoding scheme to obtain and output left channel decoded difference signals $\hat{y}_L(1), \hat{y}_L(2), \ldots, \hat{y}_L(T)$, and right channel decoded difference signals $\hat{y}_R(1), \hat{y}_R(2), \ldots, \hat{y}_R(T)$ (step S220). A decoding scheme corresponding to the coding scheme used by the stereo coding unit 170 of the corresponding coding device 100 is used as the prescribed decoding scheme. The total number of bits of the stereo code CS is $b_S$.

Left Channel Subtraction Gain Decoding Unit 230

The left channel subtraction gain code Cα input to the decoding device 200 is input to the left channel subtraction gain decoding unit 230. The left channel subtraction gain decoding unit 230 decodes the left channel subtraction gain code Cα to obtain and output the left channel subtraction gain α (step S230). The left channel subtraction gain decoding unit 230 decodes the left channel subtraction gain code Cα in a decoding method corresponding to the method used by the left channel subtraction gain estimation unit 120 of the corresponding coding device 100 to obtain the left channel subtraction gain α. A method in which the left channel subtraction gain decoding unit 230 decodes the left channel subtraction gain code Cα and obtains the left channel subtraction gain α in the case where the left channel subtraction gain estimation unit 120 of the corresponding coding device 100 obtains the left channel subtraction gain α and the left channel subtraction gain code Cα by the method based on the principle for minimizing the quantization errors will be described later.

Left Channel Signal Addition Unit 240

The monaural decoded sound signals $\hat{x}_M(1), \hat{x}_M(2), \ldots, \hat{x}_M(T)$ output by the monaural decoding unit 210, the left channel decoded difference signals $\hat{y}_L(1), \hat{y}_L(2), \ldots, \hat{y}_L(T)$ output by the stereo decoding unit 220, and the left channel subtraction gain α output by the left channel subtraction gain decoding unit 230 are input to the left channel signal addition unit 240. The left channel signal addition unit 240 obtains and outputs a sequence of values $\hat{y}_L(t)+\alpha\times\hat{x}_M(t)$ obtained by adding the sample value $\hat{y}_L(t)$ of the left channel decoded difference signal and the value $\alpha\times\hat{x}_M(t)$ obtained by multiplying the sample value $\hat{x}_M(t)$ of the monaural decoded sound signal and the left channel subtraction gain α, for each corresponding sample t, as left channel decoded sound signals $\hat{x}_L(1), \hat{x}_L(2), \ldots, \hat{x}_L(T)$ (step S240). In other words, $\hat{x}_L(t)=\hat{y}_L(t)+\alpha\times\hat{x}_M(t)$.

Right Channel Subtraction Gain Decoding Unit 250

The right channel subtraction gain code Cβ input to the decoding device 200 is input to the right channel subtraction gain decoding unit 250. The right channel subtraction gain decoding unit 250 decodes the right channel subtraction gain code Cβ to obtain and output the right channel subtraction gain β (step S250). The right channel subtraction gain decoding unit 250 decodes the right channel subtraction gain code Cβ in a decoding method corresponding to the method used by the right channel subtraction gain estimation unit 140 of the corresponding coding device 100 to obtain the right channel subtraction gain β. A method in which the right channel subtraction gain decoding unit 250 decodes the right channel subtraction gain code Cβ and obtains the right channel subtraction gain β in the case where the right channel subtraction gain estimation unit 140 of the corresponding coding device 100 obtains the right channel subtraction gain β and the right channel subtraction gain code Cβ by the method based on the principle for minimizing the quantization errors will be described later.

Right Channel Signal Addition Unit 260

The monaural decoded sound signals $\hat{x}_M(1), \hat{x}_M(2), \ldots, \hat{x}_M(T)$ output by the monaural decoding unit 210, the right channel decoded difference signals $\hat{y}_R(1), \hat{y}_R(2), \ldots, \hat{y}_R(T)$ output by the stereo decoding unit 220, and the right channel subtraction gain β output by the right channel subtraction gain decoding unit 250 are input to the right channel signal addition unit 260. The right channel signal addition unit 260 obtains and outputs a sequence of values $\hat{y}_R(t)+\beta\times\hat{x}_M(t)$ obtained by adding the sample value $\hat{y}_R(t)$ of the right channel decoded difference signal and the value $\beta\times\hat{x}_M(t)$ obtained by multiplying the sample value $\hat{x}_M(t)$ of the monaural decoded sound signal and the right channel subtraction gain β, for each corresponding sample t, as right channel decoded sound signals $\hat{x}_R(1), \hat{x}_R(2), \ldots, \hat{x}_R(T)$ (step S260). In other words, $\hat{x}_R(t)=\hat{y}_R(t)+\beta\times\hat{x}_M(t)$.

Principle for Minimizing Quantization Errors

The principle for minimizing quantization errors will be described below. In a case where the left channel difference signals and the right channel difference signals input in the stereo coding unit 170 are coded together in one coding scheme, the number of bits $b_L$ used for the coding of the left channel difference signals and the number of bits $b_R$ used for the coding of the right channel difference signals may not be explicitly determined, but in the following, the description is made assuming that the number of bits used for the coding of the left channel difference signals is $b_L$, and the number of bits used for the coding of the right channel difference signal is $b_R$. In the following, mainly the left channel will be described, but the description similarly applies to the right channel.

The coding device 100 described above codes the left channel difference signals $y_L(1), y_L(2), \ldots, y_L(T)$ having values obtained by subtracting the value obtained by multiplying each sample value of the downmix signals $x_M(1), x_M(2), \ldots, x_M(T)$ and the left channel subtraction gain α, from each sample value of the input sound signals $x_L(1), x_L(2), \ldots, x_L(T)$ of the left channel, with $b_L$ bits, and codes the downmix signals $x_M(1), x_M(2), \ldots, x_M(T)$ with $b_M$ bits. The decoding device 200 described above decodes the left channel decoded difference signals $\hat{y}_L(1), \hat{y}_L(2), \ldots, \hat{y}_L(T)$ from the $b_L$ bit code (hereinafter also referred to as "quantized left channel difference signals") and decodes the monaural decoded sound signals $\hat{x}_M(1), \hat{x}_M(2), \ldots, \hat{x}_M(T)$ from the $b_M$ bit code (hereinafter also referred to as "quantized downmix signals"), and then adds the value obtained by multiplying each sample value of the quantized downmix signals $\hat{x}_M(1), \hat{x}_M(2), \ldots, \hat{x}_M(T)$ obtained by the decoding by the left channel subtraction gain α, to each sample value of the quantized left channel difference signals $\hat{y}_L(1), \hat{y}_L(2), \ldots, \hat{y}_L(T)$ obtained by the decoding, to obtain the left channel decoded sound signals $\hat{x}_L(1), \hat{x}_L(2), \ldots, \hat{x}_L(T)$, which are the decoded sound signals of the left channel. The coding device 100 and the decoding device 200 should be designed such that the energy of the quantization errors possessed by the decoded sound signals of the left channel obtained in the processes described above is reduced.

The energy of the quantization errors (hereinafter referred to as "quantization errors generated by coding" for convenience) possessed by the decoded signals obtained by coding and decoding input signals is roughly proportional to the energy of the input signals in many cases, and tends to be exponentially smaller with respect to the value of the number of bits per sample used for the coding. Thus, the average energy of the quantization errors per sample resulting from the coding of the left channel difference signals can be estimated using a positive number $\sigma_L^2$ as in Expression (1-0-1) below, and the average energy of the quantization errors per sample resulting from the coding of the downmix signals can be estimated using a positive number $\sigma_M^2$ as in Expression (1-0-2) below.

[Math. 1]

$$\sigma_L^2 2^{-\frac{2b_L}{T}} \tag{1-0-1}$$

[Math. 2]

$$\sigma_M^2 2^{-\frac{2b_M}{T}} \tag{1-0-2}$$

Here, suppose that each sample values of the input sound signals $x_L(1), x_L(2), \ldots, x_L(T)$ of the left channel and the downmix signals $x_M(1), x_M(2), \ldots, x_M(T)$ are close values such that the input sound signals $x_L(1), x_L(2), \ldots, x_L(T)$ of the left channel and the downmix signals $x_M(1), x_M(2), \ldots, x_M(T)$ can be regarded as the same sequence. For example, a case in which the input sound signals $x_L(1), x_L(2), \ldots, x_L(T)$ of the left channel and the input signals $x_R(1), x_R(2), \ldots, x_R(T)$ of the right channel are obtained by collecting sounds originating from a sound source that is equidistant from two microphones in an environment where background noise or reflections are not much corresponds to this condition. Under this condition, each sample value of the left channel difference signals $y_L(1), y_L(2), \ldots, y_L(T)$ is equivalent to the value obtained by multiplying a corresponding sample value of the downmix signals $x_M(1), x_M(2), \ldots, x_M(T)$ by $(1-\alpha)$. Thus, because the energy of the left channel difference signals can be expressed by $(1-\alpha)^2$ times the energy of the downmix signals, $\sigma_L^2$ described above can be replaced with $(1-\alpha)^2\times\sigma_M^2$ using $\sigma_M^2$ described above, so the average energy of the quantization errors per sample resulting from the coding of the left channel difference signals can be estimated as in Expression (1-1) below.

[Math. 3]

$$(1-\alpha)^2\sigma_M^2 2^{-\frac{2b_L}{T}} \tag{1-1}$$

The average energy of the quantization errors per sample possessed by the signals added to the quantized left channel difference signals in the decoding device, that is, the average energy of the quantization errors per sample possessed by a sequence of values obtained by multiplying each sample value of the quantized downmix signals obtained by the decoding and the left channel subtraction gain α can be estimated as in Expression (1-2) below.

[Math. 4]

$$\alpha^2\sigma_M^2 2^{-\frac{2b_M}{T}} \tag{1-2}$$

Assuming that there is no correlation between the quantization errors resulting from the coding of the left channel difference signals and the quantization errors possessed by the sequence of values obtained by multiplying each sample value of the quantized downmix signals obtained by the decoding by the left channel subtraction gain α, the average energy of the quantization errors per sample possessed by the decoded sound signals of the left channel is estimated by the sum of Expressions (1-1) and (1-2). The left channel subtraction gain α which minimizes the energy of the quantization errors possessed by the decoded sound signals of the left channel is determined as in Equation (1-3) below.

[Math. 5]

$$\alpha = \frac{2^{-\frac{2b_L}{T}}}{2^{-\frac{2b_L}{T}} + 2^{-\frac{2b_M}{T}}} \quad (1-3)$$

In other words, in order to minimize the quantization errors possessed by the decoded sound signals of the left channel in a condition where the sample values of the input sound signals $x_L(1), x_L(2), \ldots, x_L(T)$ of the left channel and the downmix signals $x_M(1), x_M(2), \ldots, x_M(T)$ are close values such that the input sound signals $x_L(1), x_L(2), \ldots, x_L(T)$ of the left channel and the downmix signals $x_M(1), x_M(2), \ldots, x_M(T)$ can be regarded as the same sequence, the left channel subtraction gain estimation unit 120 only needs to calculate the left channel subtraction gain α by Equation (1-3). The left channel subtraction gain α obtained in Equation (1-3) is a value greater than 0 and less than 1, is 0.5 when $b_L$ and $b_M$, which are the two numbers of bits used for the coding, are equal, is a value closer to 0 than 0.5 as the number of bits $b_L$ for coding the left channel difference signals is greater than the number of bits $b_M$ for coding the downmix signals, and is a value closer to 1 than 0.5 as the number of bits $b_M$ for coding the downmix signals is greater than the number of bits $b_L$ for coding the left channel difference signals.

This similarly applies to the right channel, and in order to minimize the quantization errors possessed by the decoded sound signals of the right channel in a condition where the sample values of the input sound signals $x_R(1), x_R(2), \ldots, x_R(T)$ of the right channel and the downmix signals $x_M(1), x_M(2), \ldots, x_M(T)$ are close values such that the input sound signals $x_R(1), x_R(2), \ldots, x_R(T)$ of the right channel and the downmix signals $x_M(1), x_M(2), \ldots, x_M(T)$ can be regarded as the same sequence, the right channel subtraction gain estimation unit 140 only needs to calculate the right channel subtraction gain β by Equation (1-3-2) below.

[Math. 6]

$$\beta = \frac{2^{-\frac{2b_R}{T}}}{2^{-\frac{2b_R}{T}} + 2^{-\frac{2b_M}{T}}} \quad (1\text{-}3\text{-}2)$$

The right channel subtraction gain β obtained in Equation (1-3-2) is a value greater than 0 and less than 1, is 0.5 when $b_R$ and $b_M$, which are the two numbers of bits used for the coding, are equal, is a value closer to 0 than 0.5 as the number of bits $b_R$ for coding the right channel difference signals is greater than the number of bits $b_M$ for coding the downmix signals, and is a value closer to 1 than 0.5 as the number of bits $b_M$ for coding the downmix signals is greater than the number of bits $b_R$ for coding the right channel difference signals.

Next, a principle for minimizing the energy of the quantization errors possessed by the decoded sound signals of the left channel will be described, including a case in which the input sound signals $x_L(1), x_L(2), \ldots, x_L(T)$ of the left channel and the downmix signals $x_M(1), x_M(2), \ldots, x_M(T)$ are not regarded as the same sequence.

The normalized inner product value $r_L$ of the input sound signals $x_L(1), x_L(2), \ldots, x_L(T)$ of the left channel and the downmix signal $x_M(1), x_M(2), \ldots, x_M(T)$ is represented by Equation (1-4) below.

[Math. 7]

$$r_L = \frac{\sum_{t=1}^{T} x_L(t) x_M(t)}{\sum_{t=1}^{T} x_M(t) x_M(t)} \quad (1\text{-}4)$$

The normalized inner product value $r_L$ obtained by Equation (1-4) is an actual value, and when each sample value of the downmix signals $x_M(1), x_M(2), \ldots, x_M(T)$ is multiplied by an actual value $r_L'$ to obtain a sequence of sample values $r_L' \times x_M(1), x_M(2), \ldots, r_L' \times x_M(T)$, the normalized inner product value $r_L$ is the same value as the actual value rL', where the energy of the sequence $x_L(1)-r_L' \times x_M(1), x_L(2)-r_L' \times x_M(2), \ldots, x_L(T)-r_L' \times x_M(T)$ obtained by the difference between the obtained sequence of the sample values and each sample value of the input sound signals of the left channel is minimized.

The input sound signals $x_L(1), x_L(2), \ldots, x_L(T)$ of the left channel can be decomposed as $x_L(t)=r_L \times x_M(t)+(x_L(t)-r_L \times x_M(t))$ for each sample number t. Here, assuming that a sequence constituted by the values of $x_L(t)-r_L \times x_M(t)$ is orthogonal signals $x_L'(1), x_L'(2), \ldots, x_L'(T)$, according to the decomposition, each sample value $y_L(t)=x_L(t)-\alpha x_M(t)$ of the left channel difference signals is equivalent to the sum $(r_L-\alpha) \times x_M(t)+x_L'(t)$ of the value $(r_L-\alpha) \times x_M(t)$ obtained by multiplying each sample value $x_M(t)$ of the downmix signals $x_M(1), x_M(2), \ldots, x_M(T)$ by $(r_L-\alpha)$ using the normalized inner product value $r_L$ and the left channel subtraction gain α, and each sample value $x_L'(t)$ of the orthogonal signals. Because the orthogonal signals $x_L'(1), x_L'(2), \ldots, x_L'(T)$, indicate orthogonality with respect to the downmix signals $x_M(1), x_M(2), \ldots, x_M(T)$, in other words, the property that the inner product is 0, the energy of the left channel difference signals is expressed as the sum of the energy of the downmix signals multiplied by $(r_L-\alpha)^2$ and the energy of the orthogonal signals. Thus, the average energy of the quantization errors per sample resulting from coding the left channel difference signals with $b_L$ bits can be estimated using a positive number $\sigma^2$ as in Expression (1-5) below.

[Math. 8]

$$\{(r_L - \alpha)^2 \sigma_M^2 + \sigma^2\} 2^{-\frac{2b_L}{T}} \quad (1\text{-}5)$$

Assuming that there is no correlation between the quantization errors resulting from the coding of the left channel difference signals and the quantization errors possessed by the sequence of values obtained by multiplying each sample value of the quantized downmix signals obtained by the decoding by the left channel subtraction gain α, the average energy of the quantization errors per sample possessed by the decoded sound signals of the left channel is estimated by the sum of Expressions (1-5) and (1-2). The left channel subtraction gain α which minimizes the energy of the quantization errors possessed by the decoded sound signals of the left channel is determined as in Equation (1-6) below.

[Math. 9]

$$\alpha = \frac{2^{-\frac{2b_L}{T}}}{2^{-\frac{2b_L}{T}} + 2^{-\frac{2b_M}{T}}} r_L \quad (1\text{-}6)$$

In other words, in order to minimize the quantization errors of the decoded sound signals of the left channel, the left channel subtraction gain estimation unit 120 only needs to calculate the left channel subtraction gain α by Equation (1-6). In other words, considering this principle for minimizing the energy of the quantization errors, the left channel subtraction gain α should use a value obtained by multiplying the normalized inner product value $r_L$ and a correction coefficient that is a value determined by $b_L$ and $b_M$, which are the numbers of bits used for the coding. The correction coefficient is a value greater than 0 and less than 1, is 0.5 when the number of bits $b_L$ for coding the left channel difference signals and the number of bits $b_M$ for coding the downmix signals are the same, is closer to 0 than 0.5 as the number of bits $b_L$ for coding the left channel difference signals is greater than the number of bits $b_M$ for coding the downmix signals, and is closer to 1 than 0.5 as the number of bits $b_L$ for coding the left channel difference signals is less than the number of bits $b_M$ for coding the downmix signals.

This similarly applies to the right channel, and in order to minimize the quantization errors of the decoded sound signals of the right channel, the right channel subtraction gain estimation unit 140 calculates the right channel subtraction gain β by Equation (1-6-2) below.

[Math. 10]

$$\beta = \frac{2^{-\frac{2b_R}{T}}}{2^{-\frac{2b_R}{T}} + 2^{-\frac{2b_M}{T}}} r_R \quad (1\text{-}6\text{-}2)$$

Here, $r_R$ is a normalized inner product value of the input sound signals $x_R(1), x_R(2), \ldots, x_R(T)$ of the right channel and the downmix signals $x_M(1), x_M(2), \ldots, x_M(T)$, which is expressed by Equation (1-4-2) below.

[Math. 11]

$$r_R = \frac{\sum_{t=1}^{T} x_R(t)x_M(t)}{\sum_{t=1}^{T} x_M(t)x_M(t)} \quad (1\text{-}4\text{-}2)$$

In other words, considering this principle for minimizing the energy of the quantization errors, the right channel subtraction gain β should use a value obtained by multiplying the normalized inner product value $r_R$ and a correction coefficient that is a value determined by $b_R$ and $b_M$, which are the numbers of bits used for the coding. The correction coefficient is a value greater than 0 and less than 1, is a value closer to 0 than 0.5 as the number of bits $b_R$ for coding the right channel difference signals is greater than the number of bits $b_M$ for coding the downmix signals, and closer to 1 than 0.5 as the number of bits for coding the right channel difference signals is less than the number of bits for coding the downmix signals.

Estimation and Decoding of Subtraction Gain Based on Principle for Minimizing Quantization Errors Specific examples of the estimation and decoding of the subtraction gain based on the principle for minimizing the quantization errors described above will be described. In each example, the left channel subtraction gain estimation unit 120 and the right channel subtraction gain estimation unit 140 configured to estimate a subtraction gain in the coding device 100 and the left channel subtraction gain decoding unit 230 and the right channel subtraction gain decoding unit 250 configured to decode a subtraction gain in the decoding device 200 will be described.

Example 1

Example 1 is based on the principle for minimizing the energy of the quantization errors possessed by the decoded sound signals of the left channel, including a case in which the input sound signals $x_L(1), x_L(2), \ldots, x_L(T)$ of the left channel and the downmix signals $x_M(1), x_M(2), \ldots, x_M(T)$ are not regarded as the same sequence, and the principle for minimizing the energy of the quantization errors possessed by the decoded sound signals of the right channel, including a case in which the input sound signals $x_R(1), x_R(2), x_R(T)$ of the right channel and the downmix signals $x_M(1), x_M(2), \ldots, x_M(T)$ are not regarded as the same sequence.

Left Channel Subtraction Gain Estimation Unit 120

Figure 5:
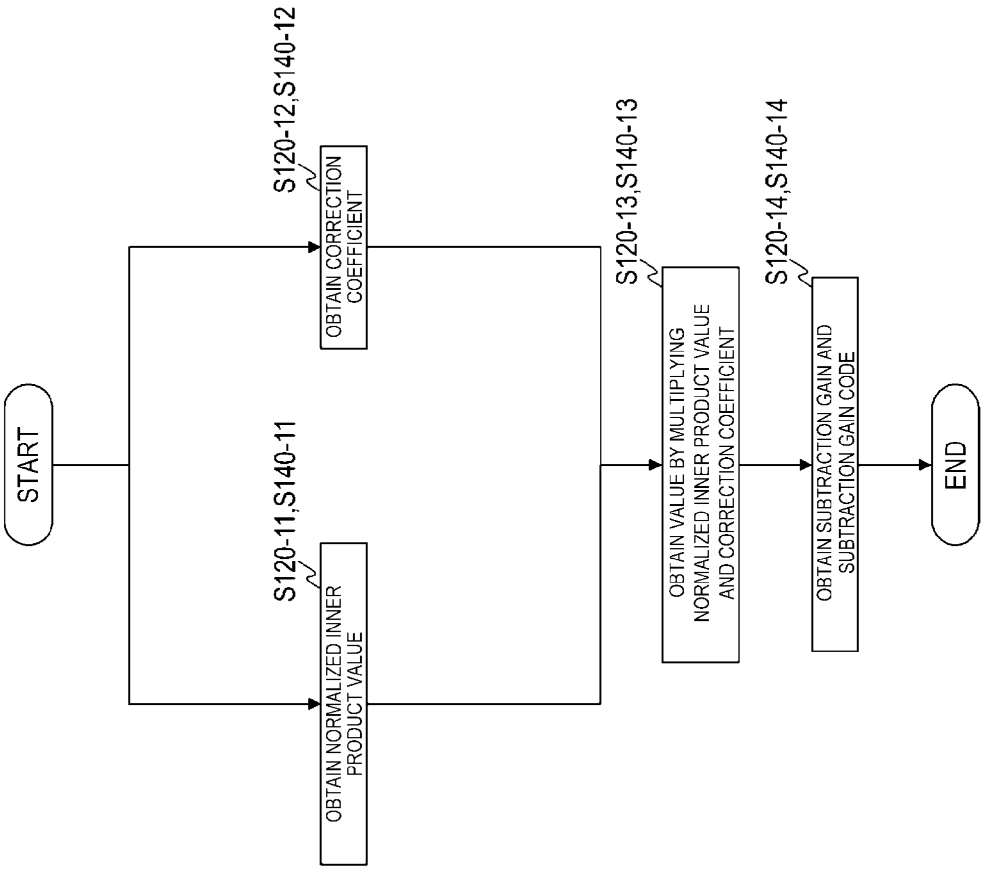
FIG. 5 is a flowchart illustrating an example of processing of a left channel subtraction gain estimation unit and a right channel subtraction gain estimation unit according to the reference embodiment.

The left channel subtraction gain estimation unit 120 stores in advance a plurality of sets (A sets, a=1, . . . , A) of candidates of the left channel subtraction gain $\alpha_{cand}(a)$ and the codes $C\alpha_{cand}(a)$ corresponding to the candidates. The left channel subtraction gain estimation unit 120 performs steps S120-11 to S120-14 below illustrated in FIG. 5.

The left channel subtraction gain estimation unit 120 first obtains the normalized inner product value $r_L$ for the input sound signals of the left channel of the downmix signals by Equation (1-4) from the input sound signals $x_L(1), x_L(2), \ldots, x_L(T)$ of the left channel and the downmix signals $x_M(1), x_M(2), \ldots, x_M(T)$ input (step S120-11). The left channel subtraction gain estimation unit 120 obtains the left channel correction coefficient $c_L$ by Equation (1-7) below by using the number of bits $b_L$ used for the coding of the left channel difference signals $y_L(1), y_L(2), \ldots, y_L(T)$ in the stereo coding unit 170, the number of bits $b_M$ used for the coding of the downmix signals $x_M(1), x_M(2), \ldots, x_M(T)$ in the monaural coding unit 160, and the number of samples T per frame (step S120-12).

[Math. 12]

$$c_L = \frac{2^{-\frac{2b_L}{T}}}{2^{-\frac{2b_L}{T}} + 2^{-\frac{2b_M}{T}}} \quad (1\text{-}7)$$

The left channel subtraction gain estimation unit 120 then obtains a value obtained by multiplying the normalized inner product value $r_L$ obtained in step S120-11 and the left channel correction coefficient $c_L$ obtained in step S120-12 (step S120-13). The left channel subtraction gain estimation unit 120 then obtains a candidate closest to the multiplication value $c_L \times r_L$ obtained in step S120-13 (quantized value of the multiplication value $c_L \times r_L$) of the stored candidates $\alpha_{cand}(1), \ldots, \alpha_{cand}(A)$ of the left channel subtraction gain as the left channel subtraction gain α, and obtains the code corresponding to the left channel subtraction gain α of the stored codes $C\alpha_{cand}(1), \ldots, C\alpha_{cand}(A)$ as the left channel subtraction gain code Cα (step S120-14).

Note that in a case where the number of bits $b_L$ used for the coding of the left channel difference signals $y_L(1), y_L(2), \ldots, y_L(T)$ in the stereo coding unit 170 is not explicitly determined, it is only needed to use half of the number of bits $b_s$ of the stereo code CS output by the stereo coding unit 170 (that is, $b_s/2$) as the number of bits Instead of the value obtained by Equation (1-7) itself, the left channel correction coefficient $c_L$ may be a value greater than 0 and less than 1, may be 0.5 when the number of bits $b_L$ used for the coding of the left channel difference signals $y_L(1)$, $y_L(2)$, . . . , $y_L(T)$ and the number of bits $b_M$ used for the coding of the downmix signals $x_M(1)$, $x_M(2)$, $x_M(T)$ are the same, and may be a value closer to 0 than 0.5 as the number of bits $b_L$ is greater than the number of bits $b_M$ and closer to 1 than 0.5 as the number of bits $b_L$ is less than the number of bits $b_M$. These similarly apply to each example described later.

Right Channel Subtraction Gain Estimation Unit 140

The right channel subtraction gain estimation unit 140 stores in advance a plurality of sets (B sets, b=1, . . . , B) of candidates of the right channel subtraction gain $\beta_{cand}(b)$ and the codes $C\beta_{cand}(b)$ corresponding to the candidates. The right channel subtraction gain estimation unit 140 performs steps S140-11 to S140-14 below illustrated in FIG. 5.

The right channel subtraction gain estimation unit 140 first obtains the normalized inner product value $r_R$ for the input sound signals of the right channel of the downmix signals by Equation (1-4-2) from the input sound signals $x_R(1)$, $x_R(2)$, . . . , $x_R(T)$ of the right channel and the downmix signals $x_M(1)$, $x_M(2)$, . . . , $x_M(T)$ input (step S140-11). The right channel subtraction gain estimation unit 140 obtains the right channel correction coefficient $c_R$ by Equation (1-7-2) below by using the number of bits $b_R$ used for the coding of the right channel difference signals $y_R(1)$, $y_R(2)$, . . . , $y_R(T)$ in the stereo coding unit 170, the number of bits $b_M$ used for the coding of the downmix signals $x_M(1)$, $x_M(2)$, . . . , $x_M(T)$ in the monaural coding unit 160, and the number of samples T per frame (step S140-12).

[Math. 13]

$$c_R = \frac{2^{-\frac{2b_R}{T}}}{2^{-\frac{2b_R}{T}} + 2^{-\frac{2b_M}{T}}} \quad (1\text{-}7\text{-}2)$$

The right channel subtraction gain estimation unit 140 then obtains a value obtained by multiplying the normalized inner product value $r_R$ obtained in step S140-11 and the right channel correction coefficient $c_R$ obtained in step S140-12 (step S140-13). The right channel subtraction gain estimation unit 140 then obtains a candidate closest to the multiplication value $c_R \times r_R$ obtained in step S140-13 (quantized value of the multiplication value $c_R \times r_R$) of the stored candidates $\beta_{cand}(1)$, . . . , $\beta_{cand}(B)$ of the right channel subtraction gain as the right channel subtraction gain β, and obtains the code corresponding to the right channel subtraction gain β of the stored codes $C\beta_{cand}(1)$, . . . , $C\beta_{cand}(B)$ as the right channel subtraction gain code Cβ (step S140-14).

Note that in a case where the number of bits $b_R$ used for the coding of the right channel difference signals $y_R(1)$, $y_R(2)$, . . . , $y_R(T)$ in the stereo coding unit 170 is not explicitly determined, it is only needed to use half of the number of bits $b_s$ of the stereo code CS output by the stereo coding unit 170 (that is, $b_s/2$), as the number of bits $b_R$. Instead of the value obtained by Equation (1-7-2) itself, the right channel correction coefficient $c_R$ may be a value greater than 0 and less than 1, may be 0.5 when the number of bits $b_R$ used for the coding of the right channel difference signals $y_R(1)$, $y_R(2)$, $y_R(T)$ and the number of bits $b_M$ used for the coding of the downmix signals $x_M(1)$, $x_M(2)$, . . . , $x_M(T)$ are the same, and may be a value closer to 0 than 0.5 as the number of bits $b_R$ is greater than the number of bits $b_M$ and closer to 1 than 0.5 as the number of bits $b_R$ is less than the number of bits $b_M$. These similarly apply to each example described later.

Left Channel Subtraction Gain Decoding Unit 230

The left channel subtraction gain decoding unit 230 stores in advance a plurality of sets (A sets, a=1, . . . , A) of candidates of the left channel subtraction gain $\alpha_{cand}(a)$ and the codes $C\alpha_{cand}(a)$ corresponding to the candidates, which are the same as those stored in the left channel subtraction gain estimation unit 120 of the corresponding coding device 100. The left channel subtraction gain decoding unit 230 obtains a candidate of the left channel subtraction gain corresponding to an input left channel subtraction gain code Cα of the stored codes $C\alpha_{cand}(1)$, . . . , $C\alpha_{cand}(A)$ as the left channel subtraction gain α (step S230-11).

Right Channel Subtraction Gain Decoding Unit 250

The right channel subtraction gain decoding unit 250 stores in advance a plurality of sets (B sets, b=1, B) of candidates of the right channel subtraction gain $\beta_{cand}(b)$ and the codes $C\beta_{cand}(b)$ corresponding to the candidates, which are the same as those stored in the right channel subtraction gain estimation unit 140 of the corresponding coding device 100. The right channel subtraction gain decoding unit 250 obtains a candidate of the right channel subtraction gain corresponding to an input right channel subtraction gain code Cβ of the stored codes $C\beta_{cand}(1)$, . . . , $C\beta_{cand}(B)$ as the right channel subtraction gain β (step S250-11).

Note that the left channel and the right channel only needs to use the same candidates or codes of subtraction gain, and by using the same value for the above-described A and B, the set of the candidates of the left channel subtraction gain $\alpha_{cand}(a)$ and the codes $C\alpha_{cand}(a)$ corresponding to the candidates stored in the left channel subtraction gain estimation unit 120 and the left channel subtraction gain decoding unit 230 and the set of the candidates of the right channel subtraction gain $\beta_{cand}(b)$ and the codes $C\beta_{cand}(b)$ corresponding to the candidates stored in the right channel subtraction gain estimation unit 140 and the right channel subtraction gain decoding unit 250 may be the same.

Modified Example of Example 1

Because the number of bits $b_L$ used for the coding of the left channel difference signals by the coding device 100 is the number of bits used for the decoding of the left channel difference signals by the decoding device 200, and the value of the number of bits $b_M$ used for the coding of the downmix signals by the coding device 100 is the number of bits used for the decoding of the downmix signals by the decoding device 200, the correction coefficient $c_L$ can be calculated as the same value for both the coding device 100 and the decoding device 200. Thus, with the normalized inner product value $r_L$ as the target of coding and decoding, the left channel subtraction gain α may be obtained by multiplying the quantized value $\hat{r}_L$ of the inner product value normalized by the coding device 100 and the decoding device 200 by the correction coefficient $c_L$. This similarly applies to the right channel. This mode will be described as a modified example of Example 1.

Left Channel Subtraction Gain Estimation Unit 120

Figure 6:
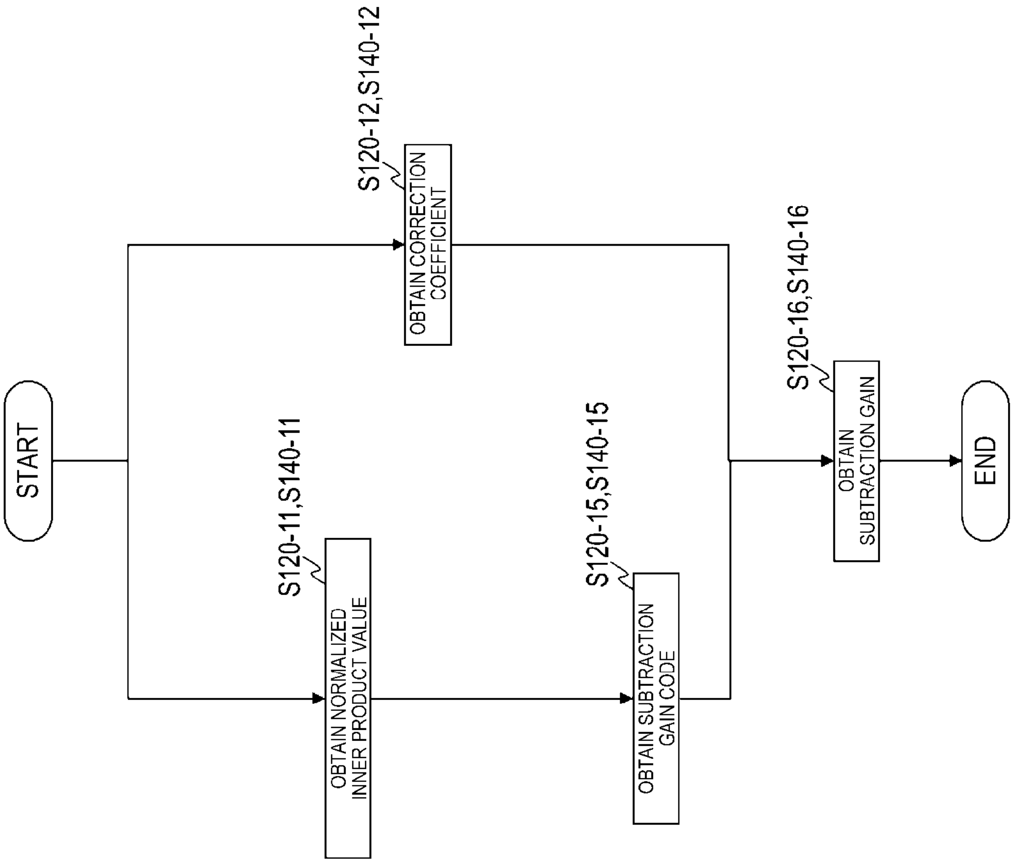
FIG. 6 is a flowchart illustrating an example of the processing of the left channel subtraction gain estimation unit and the right channel subtraction gain estimation unit according to the reference embodiment.

The left channel subtraction gain estimation unit 120 stores in advance a plurality of sets (A sets, a=1, . . . , A) of candidates of the normalized inner product value of the left channel $r_{Lcand}(a)$ and the codes $C\alpha_{cand}(a)$ corresponding to the candidates. As illustrated in FIG. 6, the left channel subtraction gain estimation unit 120 performs steps S120-11 and S120-12, which are also described in Example 1, and steps S120-15 and S120-16 described below.

Similarly to step S120-11 of the left channel subtraction gain estimation unit 120 of Example 1, the left channel subtraction gain estimation unit 120 first obtains the normalized inner product value $r_L$ for the input sound signals of the left channel of the downmix signals by Equation (1-4) from the input sound signals $x_L(1)$, $x_L(2)$, . . . , $x_L(T)$ of the left channel and the downmix signals $x_M(1)$, $x_M(2)$, . . . , $x_M(T)$ input (step S120-11). The left channel subtraction gain estimation unit 120 then obtains a candidate $\hat{r}_L$ closest to the normalized inner product value $r_L$ (quantized value of the normalized inner product value $r_L$) obtained in step S120-11 of the stored candidates $r_{Lcand}(1)$, . . . , $r_{Lcand}(A)$ of the normalized inner product value of the left channel, and obtains the code corresponding to the closest candidate $\hat{r}_L$ of the stored codes $C\alpha_{cand}(1)$, . . . , $C\alpha_{cand}(A)$ as the left channel subtraction gain code $C\alpha$ (step S120-15). Similarly to step S120-12 of the left channel subtraction gain estimation unit 120 of Example 1, the left channel subtraction gain estimation unit 120 obtains the left channel correction coefficient $c_L$ by Equation (1-7) by using the number of bits $b_L$ used for the coding of the left channel difference signals $y_L(1)$, $y_L(2)$, . . . , $y_L(T)$ in the stereo coding unit 170, the number of bits $b_M$ used for the coding of the downmix signals $x_M(1)$, $x_M(2)$, . . . , $x_M(T)$ in the monaural coding unit 160, and the number of samples T per frame (step S120-12). The left channel subtraction gain estimation unit 120 then obtains a value obtained by multiplying the quantized value of the normalized inner product value $\hat{r}_L$ obtained in step S120-15 and the left channel correction coefficient $c_L$ obtained in step S120-12 as the left channel subtraction gain $\alpha$ (step S120-16).

Right Channel Subtraction Gain Estimation Unit 140

The right channel subtraction gain estimation unit 140 stores in advance a plurality of sets (B sets, b=1, B) of a candidate of the normalized inner product value of the right channel $r_{Rcand}(b)$ and the code $C\beta_{cand}(b)$ corresponding to the candidate. As illustrated in FIG. 6, the right channel subtraction gain estimation unit 140 performs steps S140-11 and S140-12, which are also described in Example 1, and steps S140-15 and S140-16 described below.

Similarly to step S140-11 of the right channel subtraction gain estimation unit 140 of Example 1, the right channel subtraction gain estimation unit 140 first obtains the normalized inner product value $r_R$ for the input sound signals of the right channel of the downmix signals by Equation (1-4-2) from the input sound signals $x_R(1)$, $x_R(2)$, . . . , $x_R(T)$ of the right channel and the downmix signals $x_M(1)$, $x_M(2)$, . . . , $x_M(T)$ input (step S140-11). The right channel subtraction gain estimation unit 140 then obtains a candidate $\hat{r}_R$ closest to the normalized inner product value $r_R$ (quantized value of the normalized inner product value $r_R$) obtained in step S140-11 of the stored candidates $r_{Rcand}(1)$, . . . , $r_{Rcand}(B)$ of the normalized inner product value of the right channel, and obtains the code corresponding to the closest candidate $\hat{r}_R$ of the stored codes $C\beta_{cand}(1)$, . . . , $C\beta_{cand}(B)$ as the right channel subtraction gain code $C\beta$ (step S140-15). Similarly to step S140-12 of the right channel subtraction gain estimation unit 140 of Example 1, the right channel subtraction gain estimation unit 140 obtains the right channel correction coefficient $c_R$ by Equation (1-7-2) by using the number of bits $b_R$ used for the coding of the right channel difference signals $y_R(1)$, $y_R(2)$, . . . , $y_R(T)$ in the stereo coding unit 170, the number of bits $b_M$ used for the coding of the downmix signals $x_M(1)$, $x_M(2)$, . . . , $x_M(T)$ in the monaural coding unit 160, and the number of samples T per frame (step S140-12). The right channel subtraction gain estimation unit 140 then obtains a value obtained by multiplying the quantized value of the normalized inner product value $\hat{r}_R$ obtained in step S140-15 and the right channel correction coefficient $c_R$ obtained in step S140-12, as the right channel subtraction gain $\beta$ (step S140-16).

Left Channel Subtraction Gain Decoding Unit 230

Figure 7:
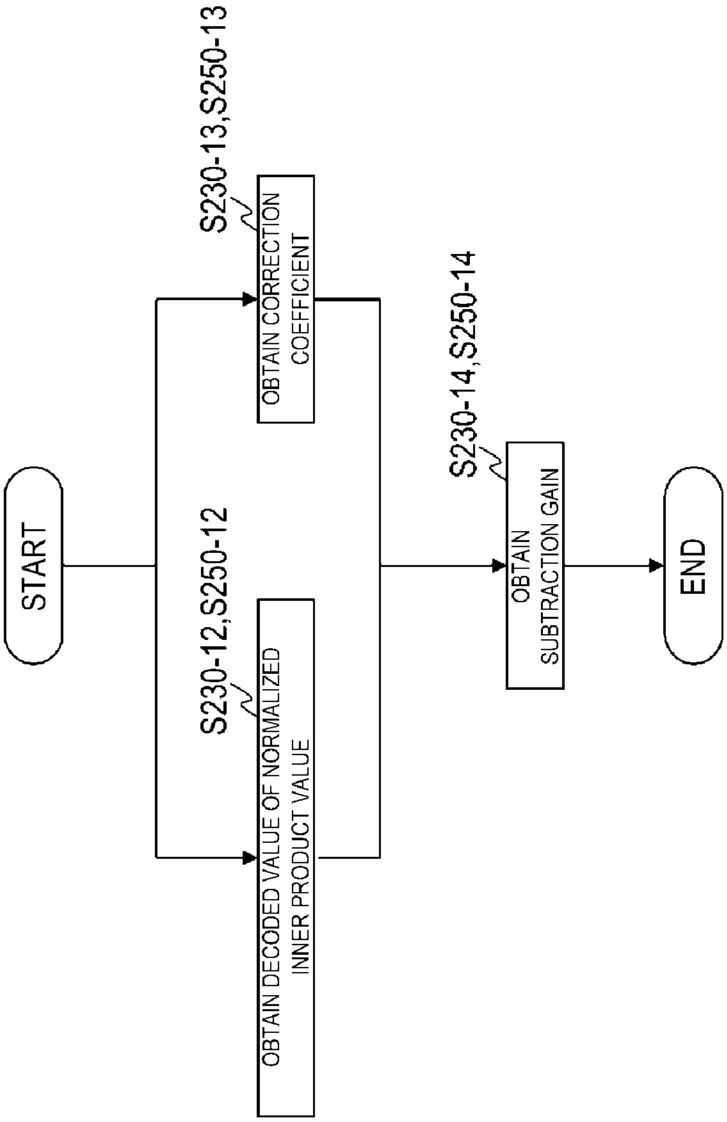
FIG. 7 is a flowchart illustrating an example of processing of a left channel subtraction gain decoding unit and a right channel subtraction gain decoding unit according to the reference embodiment.

The left channel subtraction gain decoding unit 230 stores in advance a plurality of sets (A sets, a=1, . . . , A) of a candidate of the normalized inner product value of the left channel $r_{Lcand}(a)$ and the code $C\alpha_{cand}(a)$ corresponding to the candidate, which are the same as those stored in the left channel subtraction gain estimation unit 120 of the corresponding coding device 100. The left channel subtraction gain decoding unit 230 performs steps S230-12 to S230-14 below illustrated in FIG. 7.

The left channel subtraction gain decoding unit 230 obtains a candidate of the normalized inner product value of the left channel corresponding to an input left channel subtraction gain code $C\alpha$ of the stored codes $C\alpha_{cand}(1)$, . . . , $C\alpha_{cand}(A)$ as the decoded value $\Delta r_L$ of the normalized inner product value of the left channel (step S230-12). The left channel subtraction gain decoding unit 230 obtains the left channel correction coefficient $c_L$ by Equation (1-7) by using the number of bits $b_L$ used for the decoding of the left channel decoded difference signals $\hat{y}_L(1)$, $\hat{y}_L(2)$, . . . , $\hat{y}_L(T)$ in the stereo decoding unit 220, the number of bits $b_M$ used for the decoding of the monaural decoded sound signals $\hat{x}_M(1)$, $\hat{x}_M(2)$, . . . , $\hat{x}_M(T)$ in the monaural decoding unit 210, and the number of samples T per frame (step S230-13). The left channel subtraction gain decoding unit 230 then obtains a value obtained by multiplying the decoded value of the normalized inner product value $\hat{r}_L$ obtained in step S230-12 and the left channel correction coefficient $c_L$ obtained in step S230-13, as the left channel subtraction gain $\alpha$ (step S230-14).

Note that in a case where the stereo code CS is a combination of the left channel difference code CL and the right channel difference code CR, the number of bits $b_L$ used for the decoding of the left channel decoded difference signals $\hat{y}_L(1)$, $\hat{y}_L(2)$, . . . , $\hat{y}_L(T)$ in the stereo decoding unit 220 is the number of bits of the left channel difference code CL. In a case where the number of bits $b_L$ used for the decoding of the left channel decoded difference signals $\hat{y}_L(1)$, $\hat{y}_L(2)$, . . . , $\hat{y}_L(T)$ in the stereo decoding unit 220 is not explicitly determined, it is only needed to use half of the number of bits $b_s$ of the stereo code CS input to the stereo decoding unit 220 (that is, $b_s/2$), as the number of bits $b_L$. The number of bits $b_M$ used for the decoding of the monaural decoded sound signals $\hat{x}_M(1)$, $\hat{x}_M(2)$, . . . , $\hat{x}_M(T)$ in the monaural decoding unit 210 is the number of bits of the monaural code CM. Instead of the value obtained by Equation (1-7) itself, the left channel correction coefficient $c_L$ may be a value greater than 0 and less than 1, may be 0.5 when the number of bits $b_L$ used for the decoding of the left channel decoded difference signals $\hat{y}_L(1)$, $\hat{y}_L(2)$, . . . , $\hat{y}_L(T)$ and the number of bits $b_M$ used for the decoding of the monaural decoded sound signals $\hat{x}_M(1)$, $\hat{x}_M(2)$, . . . , $\hat{x}_M(T)$ are the same, and may be a value closer to 0 than 0.5 as the number of bits $b_L$ is greater than the number of bits $b_M$ and closer to 1 than 0.5 as the number of bits $b_L$ is less than the number of bits $b_M$.

Right Channel Subtraction Gain Decoding Unit 250

The right channel subtraction gain decoding unit 250 stores in advance a plurality of sets (B sets, b=1, B) of a candidate of the normalized inner product value of the right channel $r_{Rcand}(b)$ and the code $C\beta_{cand}(b)$ corresponding to the candidate, which are the same as those stored in the right channel subtraction gain estimation unit 140 of the corresponding coding device 100. The right channel subtraction gain decoding unit 250 performs steps S250-12 to S250-14 below illustrated in FIG. 7.

The right channel subtraction gain decoding unit 250 obtains a candidate of the normalized inner product value of the right channel corresponding to an input right channel subtraction gain code Cβ of the stored codes $C\beta_{cand}(1), \ldots, C\beta_{cand}(B)$ as the decoded value $\hat{r}_R$ of the normalized inner product value of the right channel (step S250-12). The right channel subtraction gain decoding unit 250 obtains the right channel correction coefficient $c_R$ by Equation (1-7-2) by using the number of bits $b_R$ used for the decoding of the right channel decoded difference signals $\hat{y}_R(1), \hat{y}_R(2), \ldots, \hat{y}_R(T)$ in the stereo decoding unit 220, the number of bits $b_M$ used for the decoding of the monaural decoded sound signals $\hat{x}_M(1), \hat{x}_M(2), \ldots, \hat{x}_M(T)$ in the monaural decoding unit 210, and the number of samples T per frame (step S250-13). The right channel subtraction gain decoding unit 250 then obtains a value obtained by multiplying the decoded value of the normalized inner product value $\hat{r}_R$ obtained in step S250-12 and the right channel correction coefficient $c_R$ obtained in step S250-13, as the right channel subtraction gain β (step S250-14).

Note that in a case where the stereo code CS is a combination of the left channel difference code CL and the right channel difference code CR, the number of bits $b_R$ used for the decoding of the right channel decoded difference signals $\hat{y}_R(1), \hat{y}_R(2), \ldots, \hat{y}_R(T)$ in the stereo decoding unit 220 is the number of bits of the right channel difference code CR. In a case where the number of bits $b_R$ used for the decoding of the right channel decoded difference signals $\hat{y}_R(1), \hat{y}_R(2), \ldots, \hat{y}_R(T)$ in the stereo decoding unit 220 is not explicitly determined, it is only needed to use half of the number of bits $b_s$ of the stereo code CS input to the stereo decoding unit 220 (that is, $b_s/2$), as the number of bits $b_R$. The number of bits $b_M$ used for the decoding of the monaural decoded sound signals $\hat{x}_M(1), \hat{x}_M(2), \ldots, \hat{x}_M(T)$ in the monaural decoding unit 210 is the number of bits of the monaural code CM. Instead of the value obtained by Equation (1-7-2) itself, the right channel correction coefficient $c_R$ may be a value greater than 0 and less than 1, may be 0.5 when the number of bits $b_R$ used for the decoding of the right channel decoded difference signals $\hat{y}_R(1), \hat{y}_R(2), \ldots, \hat{y}_R(T)$ and the number of bits $b_M$ used for the decoding of the monaural decoded sound signals $\hat{x}_M(1), \hat{x}_M(2), \ldots, \hat{x}_M(T)$ are the same, and may be a value closer to 0 than 0.5 as the number of bits $b_R$ is greater than the number of bits $b_M$ and closer to 1 than 0.5 as the number of bits $b_R$ is less than the number of bits $b_M$.

Note that the left channel and the right channel only needs to use the same candidates or codes of normalized inner product value, and by using the same value for the above-described A and B, the set of the candidate of the normalized inner product value of the left channel $r_{Lcand}(a)$ and the code $C\alpha_{cand}(a)$ corresponding to the candidate stored in the left channel subtraction gain estimation unit 120 and the left channel subtraction gain decoding unit 230 and the set of the candidate of the normalized inner product value of the right channel $r_{Rcand}(b)$ and the code $C\beta_{cand}(b)$ corresponding to the candidate stored in the right channel subtraction gain estimation unit 140 and the right channel subtraction gain decoding unit 250 may be the same.

Note that the code Cα is referred to as a left channel subtraction gain code because the code Cα is substantially a code corresponding to the left channel subtraction gain α, for the purpose of matching the wording in the descriptions of the coding device 100 and the decoding device 200, and the like, but the code Cα may also be referred to as a left channel inner product code or the like because the code Cα represents a normalized inner product value. This similarly applies to the code Cβ, and the code Cβ may be referred to as a right channel inner product code or the like.

Example 2

An example of using a value considering input values of past frames as the normalized inner product value will be described as Example 2. Example 2 does not strictly guarantee the optimization within the frame, that is, the minimization of the energy of the quantization errors possessed by the decoded sound signals of the left channel and the minimization of the energy of the quantization errors possessed by the decoded sound signals of the right channel, but reduces abrupt fluctuation of the left channel subtraction gain α between frames and abrupt fluctuation of the right channel subtraction gain β between frames, and reduces noise generated in the decoded sound signals due to the fluctuation. In other words, Example 2 considers the auditory quality of the decoded sound signals in addition to reducing the energy of the quantization errors possessed by the decoded sound signals.

In Example 2, the coding side, that is, the left channel subtraction gain estimation unit 120 and the right channel subtraction gain estimation unit 140 are different from those in Example 1, but the decoding side, that is, the left channel subtraction gain decoding unit 230 and the right channel subtraction gain decoding unit 250 are the same as those in Example 1. Hereinafter, the differences of Example 2 from Example 1 will be mainly described.

Left Channel Subtraction Gain Estimation Unit 120

Figure 8:
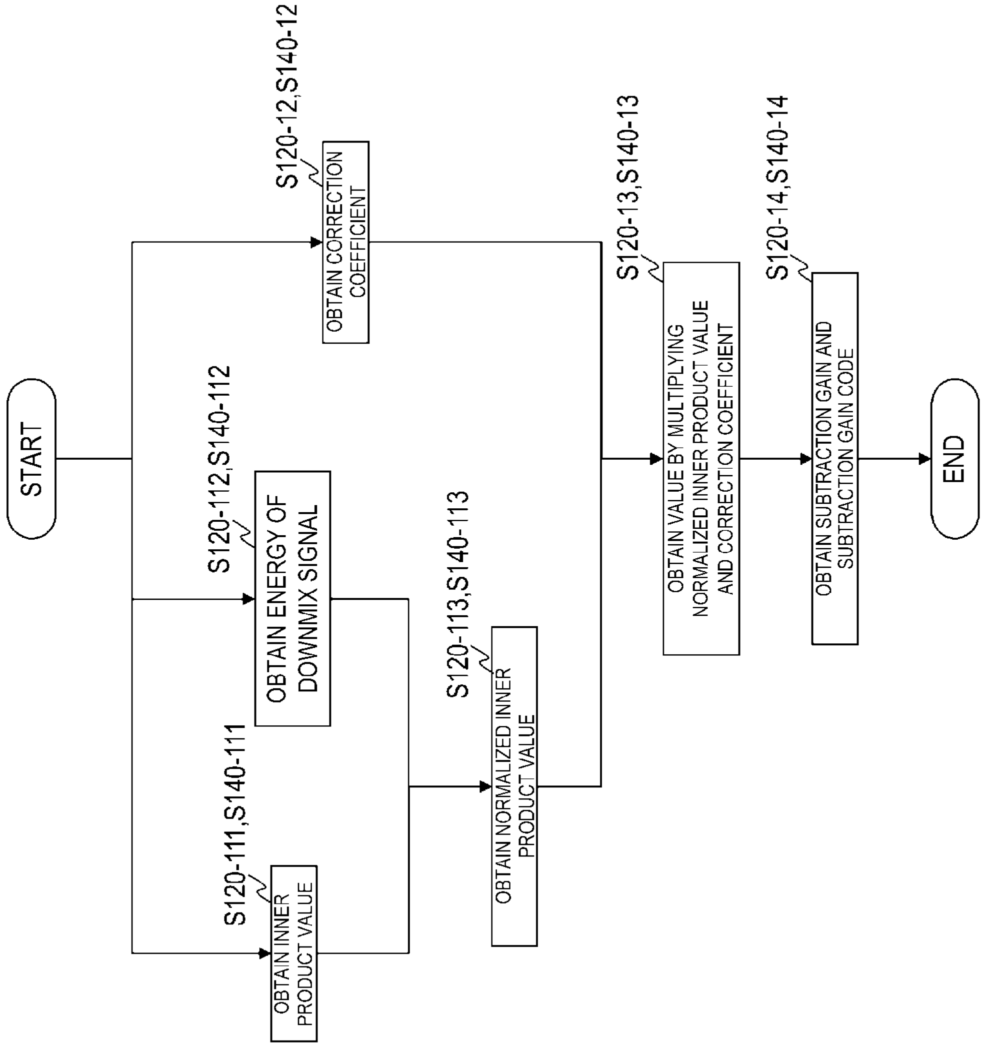
FIG. 8 is a flowchart illustrating an example of the processing of the left channel subtraction gain estimation unit and the right channel subtraction gain estimation unit according to the reference embodiment.

As illustrated in FIG. 8, the left channel subtraction gain estimation unit 120 performs steps S120-111 to S120-113 below and steps S120-12 to S120-14 described in Example 1.

The left channel subtraction gain estimation unit 120 first obtains the inner product value $E_L(0)$ used in the current frame by Equation (1-8) below by using the input sound signals $x_L(1), x_L(2), \ldots, x_L(T)$ of the left channel input, the downmix signals $x_M(1), x_M(2), \ldots, x_M(T)$ input, and the inner product value $E_L(-1)$ used in the previous frame (step S120-111).

[Math. 14]

$$E_L(0) = \epsilon_L E_L(-1) + \frac{(1-\epsilon_L)}{T}\sum_{t=1}^{T} x_L(t)x_M(t) \tag{1-8}$$

Here, $E_L$ is a predetermined value greater than 0 and less than 1, and is stored in advance in the left channel subtraction gain estimation unit 120. Note that the left channel subtraction gain estimation unit 120 stores the obtained inner product value $E_L(0)$ in the left channel subtraction gain estimation unit 120 for use in the next frame as "the inner product value $E_L(-1)$ used in the previous frame".

The left channel subtraction gain estimation unit 120 obtains the energy $E_M(0)$ of the downmix signals used in the current frame by Equation (1-9) below by using the input downmix signals $x_M(1), x_M(2), \ldots, x_M(T)$ and the energy $E_M(-1)$ of the downmix signals used in the previous frame (step S120-112).

[Math. 15]

$$E_M(0) = \epsilon_M E_M(-1) + \frac{(1-\epsilon_M)}{T} \sum_{t=1}^{T} x_M(t) x_M(t) \quad (1\text{-}9)$$

Here, $\varepsilon_M$ is a predetermined value greater than 0 and less than 1, and is stored in advance in the left channel subtraction gain estimation unit 120. Note that the left channel subtraction gain estimation unit 120 stores the obtained energy $E_M(0)$ of the downmix signals in the left channel subtraction gain estimation unit 120 for use in the next frame as "the energy $E_M(-1)$ of the downmix signals used in the previous frame".

The left channel subtraction gain estimation unit 120 then obtains the normalized inner product value $r_L$ by Equation (1-10) below by using the inner product value $E_L(0)$ used in the current frame obtained in step S120-111 and the energy $E_M(0)$ of the downmix signals used in the current frame obtained in step S120-112 (step S120-113).

[Math. 16]

$$r_L = E_L(0)/E_M(0) \quad (1\text{-}10)$$

The left channel subtraction gain estimation unit 120 also performs step S120-12, then performs step S120-13 by using the normalized inner product value $r_L$ obtained in step S120-113 described above instead of the normalized inner product value $r_L$ obtained in step S120-11, and further performs step S120-14.

Note that, as $\varepsilon_L$ and $\varepsilon_M$ described above get closer to 1, the normalized inner product value $r_L$ is more likely to include the influence of the input sound signals of the left channel and the downmix signals of the past frames, and the fluctuation between the frames of the normalized inner product value $r_L$ and the left channel subtraction gain $\alpha$ obtained by the normalized inner product value $r_L$ gets smaller.

Right Channel Subtraction Gain Estimation Unit 140

As illustrated in FIG. 8, the right channel subtraction gain estimation unit 140 performs steps S140-111 to S140-113 below and steps S140-12 to S140-14 described in Example 1.

The right channel subtraction gain estimation unit 140 first obtains the inner product value $E_R(0)$ used in the current frame by Equation (1-8-2) below by using the input sound signals $x_R(1), x_R(2), \ldots, x_R(T)$ of the right channel input, the downmix signals $x_M(1), x_M(2), \ldots, x_M(T)$ input, and the inner product value $E_R(-1)$ used in the previous frame (step S140-111).

[Math. 17]

$$E_R(0) = \epsilon_R E_R(-1) + \frac{(1-\epsilon_R)}{T} \sum_{f=1}^{T} x_R(t) x_M(t) \quad (1\text{-}8\text{-}2)$$

Here, $\varepsilon_R$ is a predetermined value greater than 0 and less than 1, and is stored in advance in the right channel subtraction gain estimation unit 140. Note that the right channel subtraction gain estimation unit 140 stores the obtained inner product value $E_R(0)$ in the right channel subtraction gain estimation unit 140 for use in the next frame as "the inner product value $E_R(-1)$ used in the previous frame".

The right channel subtraction gain estimation unit 140 obtains the energy $E_M(0)$ of the downmix signals used in the current frame by Equation (1-9) by using the input downmix signals $x_M(1), x_M(2), \ldots, x_M(T)$ and the energy $E_M(-1)$ of the downmix signals used in the previous frame (step S140-112). The right channel subtraction gain estimation unit 140 stores the obtained energy $E_M(0)$ of the downmix signals in the right channel subtraction gain estimation unit 140 for use in the next frame as "the energy $E_M(-1)$ of the downmix signals used in the previous frame". Note that because the left channel subtraction gain estimation unit 120 also obtains the energy $E_M(0)$ of the downmix signals used in the current frame by Equation (1-9), only one of the steps of step S120-112 performed by the left channel subtraction gain estimation unit 120 and step S140-112 performed by the right channel subtraction gain estimation unit 140 may be performed.

The right channel subtraction gain estimation unit 140 then obtains the normalized inner product value $r_R$ by Equation (1-10-2) below by using the inner product value $E_R(0)$ used in the current frame obtained in step S140-111 and the energy $E_M(0)$ of the downmix signals used in the current frame obtained in step S140-112 (step S140-113).

[Math. 18]

$$r_R = E_R(0)/E_M(0) \quad (1\text{-}10\text{-}2)$$

The right channel subtraction gain estimation unit 140 also performs step S140-12, then performs step S140-13 by using the normalized inner product value $r_R$ obtained in step S140-113 described above instead of the normalized inner product value $r_R$ obtained in step S140-11, and further performs step S140-14.

Note that, as $\varepsilon_R$ and $\varepsilon_M$ described above get closer to 1, the normalized inner product value $r_R$ is more likely to include the influence of the input sound signals of the right channel and the downmix signals of the past frames, and the fluctuation between the frames of the normalized inner product value $r_R$ and the right channel subtraction gain $\beta$ obtained by the normalized inner product value $r_R$ gets smaller.

Modified Example of Example 2

Example 2 can be modified in a similar manner to the modified example of Example 1 with respect to Example 1. This embodiment will be described as a modified example of Example 2. In the modified example of Example 2, the coding side, that is, the left channel subtraction gain estimation unit 120 and the right channel subtraction gain estimation unit 140 are different from those in the modified example of Example 1, but the decoding side, that is, the left channel subtraction gain decoding unit 230 and the right channel subtraction gain decoding unit 250 are the same as those in the modified example of Example 1. The differences of the modified example of Example 2 from the modified example of Example 1 are the same as those of Example 2, and thus the modified example of Example 2 will be described below with reference to the modified example of Example 1 and Example 2 as appropriate.

Left Channel Subtraction Gain Estimation Unit 120

Figure 9:
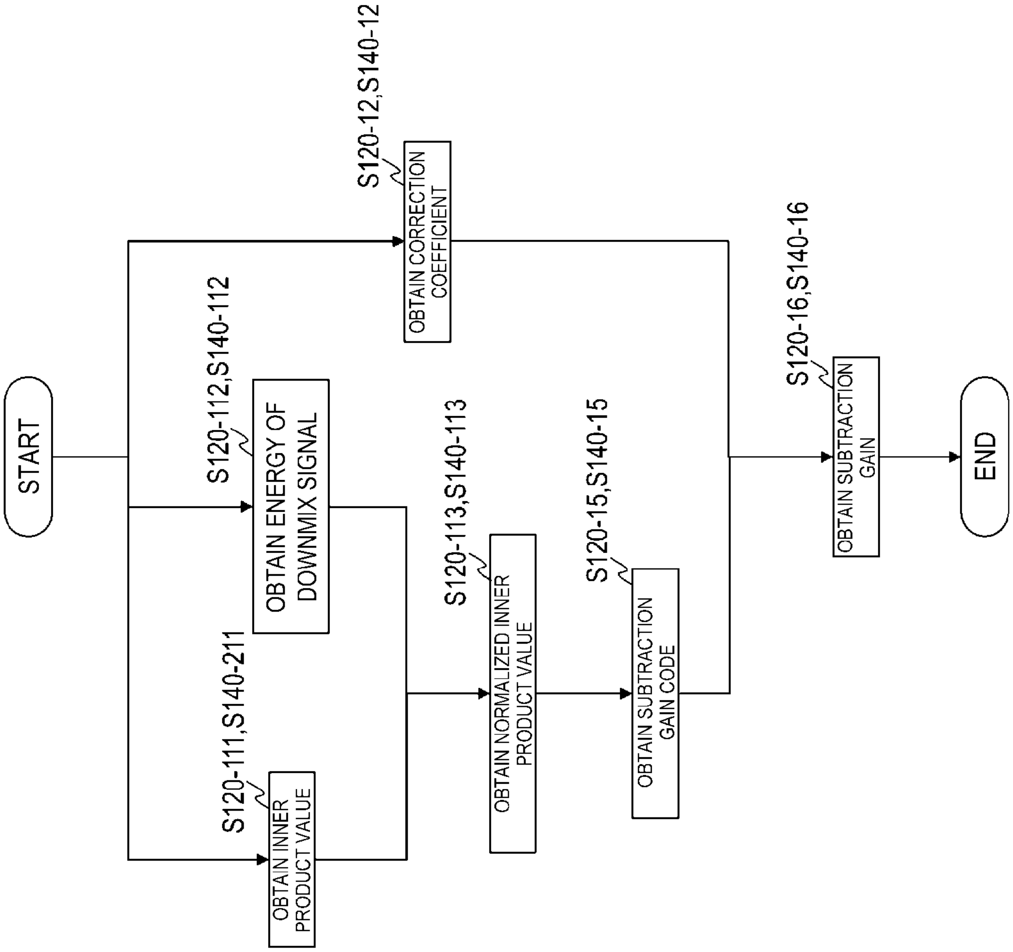
FIG. 9 is a flowchart illustrating an example of the processing of the left channel subtraction gain estimation unit and the right channel subtraction gain estimation unit according to the reference embodiment.

Similar to the left channel subtraction gain estimation unit 120 of the modified example of Example 1, the left channel subtraction gain estimation unit 120 stores in advance a plurality of sets (A sets, a=1, . . . , A) of a candidate of the normalized inner product value of the left channel $r_{Lcand}(a)$ and the code $C\alpha_{cand}(a)$ corresponding to the candidate. As illustrated in FIG. 9, the left channel subtraction gain estimation unit 120 performs steps S120-111 to S120-113, which are the same as those in Example 2, and steps S120-12, S120-15, and S120-16, which are the same as those in the modified example of Example 1. More specifically, details are as follows.

The left channel subtraction gain estimation unit 120 first obtains the inner product value $E_L(0)$ used in the current frame by Equation (1-8) by using the input sound signals $x_L(1), x_L(2), \ldots, x_L(T)$ of the left channel input, the downmix signals $x_M(1), x_M(2), \ldots, x_M(T)$ input, and the inner product value $E_L(-1)$ used in the previous frame (step S120-111). The left channel subtraction gain estimation unit 120 obtains the energy $E_M(0)$ of the downmix signals used in the current frame by Equation (1-9) by using the input downmix signals $x_M(1), x_M(2), \ldots, x_M(T)$ and the energy $E_M(-1)$ of the downmix signals used in the previous frame (step S120-112). The left channel subtraction gain estimation unit 120 then obtains the normalized inner product value $r_L$ by Equation (1-10) by using the inner product value $E_L(0)$ used in the current frame obtained in step S120-111 and the energy $E_M(0)$ of the downmix signals used in the current frame obtained in step S120-112 (step S120-113). The left channel subtraction gain estimation unit 120 then obtains a candidate $\hat{r}_L$ closest to the normalized inner product value $r_L$ (quantized value of the normalized inner product value $r_L$) obtained in step S120-113 of the stored candidates $r_{Lcand}(1), \ldots, r_{Lcand}(A)$ of the normalized inner product value of the left channel, and obtains the code corresponding to the closest candidate $\hat{r}_L$ of the stored codes $C\alpha_{cand}(1)$, $C\alpha_{cand}(A)$ as the left channel subtraction gain code $C\alpha$ (step S120-15). The left channel subtraction gain estimation unit 120 obtains the left channel correction coefficient $c_L$ by Equation (1-7) by using the number of bits $b_L$ used for the coding of the left channel difference signals $y_L(1), y_L(2), \ldots, y_L(T)$ in the stereo coding unit 170, the number of bits $b_M$ used for the coding of the downmix signals $x_M(1), x_M(2), \ldots, x_M(T)$ in the monaural coding unit 160, and the number of samples T per frame (step S120-12). The left channel subtraction gain estimation unit 120 then obtains a value obtained by multiplying the quantized value of the normalized inner product value $\hat{r}_L$ obtained in step S120-15 and the left channel correction coefficient $c_L$ obtained in step S120-12 as the left channel subtraction gain $\alpha$ (step S120-16).

Right Channel Subtraction Gain Estimation Unit 140

Similar to the right channel subtraction gain estimation unit 140 in the modified example of Example 1, the right channel subtraction gain estimation unit 140 stores in advance a plurality of sets (B sets, b=1, B) of a candidate of the normalized inner product value of the right channel $r_{Rcand}(b)$ and the code $C\beta_{cand}(b)$ corresponding to the candidate. As illustrated in FIG. 9, the right channel subtraction gain estimation unit 140 performs steps S140-111 to S140-113, which are the same as those in Example 2, and steps S140-12, S140-15, and S140-16, which are the same as those in the modified example of Example 1. More specifically, details are as follows.

The right channel subtraction gain estimation unit 140 first obtains the inner product value $E_R(0)$ used in the current frame by Equation (1-8-2) by using the input sound signals $x_R(1), x_R(2), \ldots, x_R(T)$ of the right channel input, the downmix signals $x_M(1), x_M(2), \ldots, x_M(T)$ input, and the inner product value $E_R(-1)$ used in the previous frame (step S140-111). The right channel subtraction gain estimation unit 140 obtains the energy $E_M(0)$ of the downmix signals used in the current frame by Equation (1-9) by using the input downmix signals $x_M(1), x_M(2), \ldots, x_M(T)$ and the energy $E_M(-1)$ of the downmix signals used in the previous frame (step S140-112). The right channel subtraction gain estimation unit 140 then obtains the normalized inner product value $r_R$ by Equation (1-10-2) by using the inner product value $E_R(0)$ used in the current frame obtained in step S140-111 and the energy $E_M(0)$ of the downmix signals used in the current frame obtained in step S140-112 (step S140-113). The right channel subtraction gain estimation unit 140 then obtains a candidate $\hat{r}_R$ closest to the normalized inner product value $r_R$ (quantized value of the normalized inner product value $r_R$) obtained in step S140-113 of the stored candidates $r_{Rcand}(1), \ldots, r_{Rcand}(B)$ of the normalized inner product value of the right channel, and obtains the code corresponding to the closest candidate $\hat{r}_R$ of the stored codes $C\beta_{cand}(1), \ldots, C\beta_{cand}(B)$ as the right channel subtraction gain code $C\beta$ (step S140-15). The right channel subtraction gain estimation unit 140 obtains the right channel correction coefficient $c_R$ by Equation (1-7-2) by using the number of bits $b_R$ used for the coding of the right channel difference signals $y_R(1), y_R(2), \ldots, y_R(T)$ in the stereo coding unit 170, the number of bits $b_M$ used for the coding of the downmix signals $x_M(1), x_M(2), \ldots, x_M(T)$ in the monaural coding unit 160, and the number of samples T per frame (step S140-12). The right channel subtraction gain estimation unit 140 then obtains a value obtained by multiplying the quantized value of the normalized inner product value $\hat{r}_R$ obtained in step S140-15 and the right channel correction coefficient $c_R$ obtained in step S140-12, as the right channel subtraction gain $\beta$ (step S140-16).

Example 3

For example, in a case where sounds such as voice or music included in the input sound signals of the left channel and sounds such as voice and music included in the input sound signals of the right channel are different from each other, the downmix signals may include both the components of the input sound signals of the left channel and the components of the input sound signals of the right channel. Thus, as a greater value is used as the left channel subtraction gain $\alpha$, there is a problem in that sounds originating from the input sound signals of the right channel that should not naturally be heard are included in the left channel decoded sound signals, and as a greater value is used as the right channel subtraction gain $\beta$, there is a problem in that sounds originating from the input sound signals of the left channel that should not naturally be heard are included in the right channel decoded sound signals. Thus, while the minimization of the energy of the quantization errors possessed by the decoded sound signals is not strictly guaranteed, the left channel subtraction gain $\alpha$ and the right channel subtraction gain $\beta$ may be smaller values than the values determined in Example 1, in consideration of the auditory quality. Similarly, the left channel subtraction gain $\alpha$ and the right channel subtraction gain $\beta$ may be smaller values than the values determined in Example 2.

Specifically, for the left channel, in Example 1 and Example 2, the quantized value of the multiplication value $c_L \times n$ of the normalized inner product value $r_L$ and the left channel correction coefficient $c_L$ is set as the left channel subtraction gain $\alpha$, but in Example 3, the quantized value of the multiplication value $\lambda_L \times c_L \times n$ of the normalized inner product value n, the left channel correction coefficient $c_L$, and $\lambda_L$ that is a predetermined value greater than 0 and less than 1 is set as the left channel subtraction gain $\alpha$. Thus, in a similar manner to those in Example 1 and Example 2, assuming that the multiplication value $c_L \times n$ is a target of coding in the left channel subtraction gain estimation unit 120 and decoding in the left channel subtraction gain decoding unit 230, and the left channel subtraction gain code $C\alpha$ represents the quantized value of the multiplication value $c_L \times r_L$, the left channel subtraction gain estimation unit 120 and the left channel subtraction gain decoding unit 230 may multiply the quantized value of the multiplication value $c_L \times r_L$ by $\lambda_L$ to obtain the left channel subtraction gain $\alpha$. Alternatively, the multiplication value $\lambda_L \times c_L \times r_L$ of the normalized inner product value $r_L$, the left channel correction coefficient $c_L$, and the predetermined value $\lambda_L$ may be a target of coding in the left channel subtraction gain estimation unit 120 and decoding in the left channel subtraction gain decoding unit 230, and the left channel subtraction gain code $C\alpha$ may represent the quantized value of the multiplication value $\lambda_L \times c_L \times r_L$.

Similarly, for the right channel, in Example 1 and Example 2, the quantized value of the multiplication value $c_R \times r_R$ of the normalized inner product value $r_R$ and the right channel correction coefficient $c_R$ is set as the right channel subtraction gain $\beta$, but in Example 3, the quantized value of the multiplication value $\lambda_R \times c_R \times r_R$ of the normalized inner product value $r_R$, the right channel correction coefficient $c_R$, and $\lambda_R$ that is a predetermined value greater than 0 and less than 1 is set as the right channel subtraction gain $\beta$. Thus, in a similar manner to those in Example 1 and Example 2, assuming that the multiplication value $c_R \times r_R$ is a target of coding in the right channel subtraction gain estimation unit 140 and decoding in the right channel subtraction gain decoding unit 250, and the right channel subtraction gain code $C\beta$ represents the quantized value of the multiplication value $c_R \times r_R$, the right channel subtraction gain estimation unit 140 and the right channel subtraction gain decoding unit 250 may multiply the quantized value of the multiplication value $c_R \times r_R$ by $\lambda_R$ to obtain the right channel subtraction gain $\beta$. Alternatively, the multiplication value $\lambda_R \times c_R \times r_R$ of the normalized inner product value $r_R$, the left channel correction coefficient $c_R$, and the predetermined value $\lambda_R$ may be a target of coding in the right channel subtraction gain estimation unit 140 and decoding in the right channel subtraction gain decoding unit 250, and the right channel subtraction gain code $C\beta$ may represent the quantized value of the multiplication value $\lambda_R \times c_R \times r_R$. Note that $\lambda_R$ may be the same value as 4.

Modified Example of Example 3

As described above, the correction coefficient $c_L$ can be calculated as the same value for the coding device 100 and the decoding device 200. Thus, in a similar manner to those in the modified example of Example 1 and the modified example of Example 2, assuming that the normalized inner product value $r_L$ is a target of coding in the left channel subtraction gain estimation unit 120 and decoding in the left channel subtraction gain decoding unit 230, and the left channel subtraction gain code $C\alpha$ represents the quantized value of the normalized inner product value $r_L$, the left channel subtraction gain estimation unit 120 and the left channel subtraction gain decoding unit 230 may multiply the quantized value of the normalized inner product value $r_L$, the left channel correction coefficient $c_L$, and 4 that is a predetermined value greater than 0 and less than 1 to obtain the left channel subtraction gain $\alpha$. Alternatively, assuming that the multiplication value $\lambda_L \times r_L$ of the normalized inner product value $r_L$ and $\lambda_L$ that is a predetermined value greater than 0 and less than 1 is a target of coding in the left channel subtraction gain estimation unit 120 and decoding in the left channel subtraction gain decoding unit 230, and the left channel subtraction gain code $C\alpha$ represents the quantized value of the multiplication value $\lambda_L \times r_L$, the left channel subtraction gain estimation unit 120 and the left channel subtraction gain decoding unit 230 may multiply the quantized value of the multiplication value $\lambda_L \times r_L$ by the left channel correction coefficient $c_L$ to obtain the left channel subtraction gain $\alpha$.

This similarly applies to the right channel, and the correction coefficient $c_R$ can be calculated as the same value for the coding device 100 and the decoding device 200. Thus, in a similar manner to those in the modified example of Example 1 and the modified example of Example 2, assuming that the normalized inner product value $r_R$ is a target of coding in the right channel subtraction gain estimation unit 140 and decoding in the right channel subtraction gain decoding unit 250, and the right channel subtraction gain code $C\beta$ represents the quantized value of the normalized inner product value $r_R$, the right channel subtraction gain estimation unit 140 and the right channel subtraction gain decoding unit 250 may multiply the quantized value of the normalized inner product value $r_R$, the right channel correction coefficient $c_R$, and $\lambda_R$ that is a predetermined value greater than 0 and less than 1 to obtain the right channel subtraction gain $\beta$. Alternatively, assuming that the multiplication value $\lambda_R \times r_R$ of the normalized inner product value $r_R$ and $\lambda_R$ that is a predetermined value greater than 0 and less than 1 is a target of coding in the right channel subtraction gain estimation unit 140 and decoding in the right channel subtraction gain decoding unit 250, and the right channel subtraction gain code $C\beta$ represents the quantized value of the multiplication value $\lambda_R \times r_R$, the right channel subtraction gain estimation unit 140 and the right channel subtraction gain decoding unit 250 may multiply the quantized value of the multiplication value $\lambda_R \times r_R$ by the right channel correction coefficient $c_R$ to obtain the right channel subtraction gain $\beta$.

Example 4

The problem of auditory quality described at the beginning of Example 3 occurs when the correlation between the input sound signals of the left channel and the input sound signals of the right channel is small, and the problem does not occur much when the correlation between the input sound signals of the left channel and the input sound signals of the right channel is large. Thus, in Example 4, by using a left-right correlation coefficient $\gamma$ that is a correlation coefficient of the input sound signals of the left channel and the input sound signals of the right channel instead of the predetermined value in Example 3, as the correlation between the input sound signals of the left channel and the input sound signals of the right channel is larger, the priority is given to reducing the energy of the quantization errors possessed by the decoded sound signals, and as the correlation between the input sound signals of the left channel and the input sound signals of the right channel is smaller, the priority is given to suppressing the deterioration of the auditory quality.

In Example 4, the coding side is different from those in Example 1 and Example 2, but the decoding side, that is, the left channel subtraction gain decoding unit 230 and the right channel subtraction gain decoding unit 250 are the same as those in Example 1 and Example 2. Hereinafter, the differences of Example 4 from Example 1 and Example 2 will be described.

Left-Right Relationship Information Estimation Unit 180

The coding device 100 of Example 4 also includes a left-right relationship information estimation unit 180 as illustrated by the dashed lines in FIG. 1. The input sound signals of the left channel input to the coding device 100 and the input sound signals of the right channel input to the coding device 100 are input to the left-right relationship information estimation unit 180. The left-right relationship information estimation unit 180 obtains and outputs a left-right correlation coefficient γ from the input sound signals of the left channel and the input sound signals of the right channel input (step S180).

The left-right correlation coefficient γ is a correlation coefficient of the input sound signals of the left channel and the input sound signals of the right channel, and may be a correlation coefficient $\gamma_0$ between a sample sequence of the input sound signals of the left channel $x_L(1)$, $x_L(2)$, . . . , $x_L(T)$ and a sample sequence of the input sound signals of the right channel $x_R(1)$, $x_R(2)$, . . . , $x_R(T)$, or may be a correlation coefficient taking into account the time difference, for example, a correlation coefficient $\gamma_\tau$ between a sample sequence of the input sound signals of the left channel and a sample sequence of the input sound signals of the right channel in a position shifted to a later position than that of the sample sequence by τ samples.

Assuming that sound signals obtained by AD conversion of sounds collected by the microphone for the left channel disposed in a certain space are the input sound signals of the left channel, and sound signals obtained by AD conversion of sounds collected by the microphone for the right channel disposed in the certain space are the input sound signals of the right channel, this τ is information corresponding to the difference (so-called time difference of arrival) between the arrival time from the sound source that mainly emits sound in the space to the microphone for the left channel and the arrival time from the sound source to the microphone for the right channel, and is hereinafter referred to as the left-right time difference. The left-right time difference τ may be determined by any known method and is obtained by the method described with the left-right relationship information estimation unit 181 of the first embodiment. In other words, the correlation coefficient $\gamma_\tau$ described above is information corresponding to the correlation coefficient between the sound signals reaching the microphone for the left channel from the sound source and collected and the sound signals reaching the microphone for the right channel from the sound source and collected.

Left Channel Subtraction Gain Estimation Unit 120

Instead of step S120-13, the left channel subtraction gain estimation unit 120 obtains a value obtained by multiplying the normalized inner product value $r_L$ obtained in step S120-11 or step S120-113, the left channel correction coefficient $c_L$ obtained in step S120-12, and the left-right correlation coefficient γ obtained in step S180 (step S120-13"). Instead of step S120-14, the left channel subtraction gain estimation unit 120 then obtains a candidate closest to the multiplication value $\gamma \times c_L \times r_L$ obtained in step S120-13" (quantized value of the multiplication value $\gamma \times c_L \times r_L$) of the stored candidates $\alpha_{cand}(1)$, $\alpha_{cand}(A)$ of the left channel subtraction gain as the left channel subtraction gain α, and obtains the code corresponding to the left channel subtraction gain α of the stored codes $C\alpha_{cand}(1)$, . . . , $C\alpha_{cand}(A)$ as the left channel subtraction gain code Cα (step S120-14").

Right Channel Subtraction Gain Estimation Unit 140

Instead of step S140-13, the right channel subtraction gain estimation unit 140 obtains a value obtained by multiplying the normalized inner product value $r_R$ obtained in step S140-11 or step S140-113, the right channel correction coefficient $c_R$ obtained in step S140-12, and the left-right correlation coefficient γ obtained in step S180 (step S140-13"). Instead of step S140-14, the right channel subtraction gain estimation unit 140 then obtains a candidate closest to the multiplication value $\gamma \times c_R \times r_R$ obtained in step S140-13" (quantized value of the multiplication value $\gamma \times c_R \times r_R$) of the stored candidates $\beta_{cand}(1)$, . . . , $\beta_{cand}(B)$ of the right channel subtraction gain as the right channel subtraction gain β, and obtains the code corresponding to the right channel subtraction gain β of the stored codes $C\beta_{cand}(1)$, . . . , $C\beta_{cand}(B)$ as the right channel subtraction gain code Cβ (step S140-14").

Modified Example of Example 4

As described above, the correction coefficient $c_L$ can be calculated as the same value for the coding device 100 and the decoding device 200. Thus, assuming that the multiplication value $\gamma \times r_L$ of the normalized inner product value $r_L$ and the left-right correlation coefficient γ is a target of coding in the left channel subtraction gain estimation unit 120 and decoding in the left channel subtraction gain decoding unit 230, and the left channel subtraction gain code Cα represents the quantized value of the multiplication value $\gamma \times r_L$, the left channel subtraction gain estimation unit 120 and the left channel subtraction gain decoding unit 230 may multiply the quantized value of the multiplication value $\gamma \times r_L$ by the left channel correction coefficient $c_L$ to obtain the left channel subtraction gain α.

This similarly applies to the right channel, and the correction coefficient $c_R$ can be calculated as the same value for the coding device 100 and the decoding device 200. Thus, assuming that the multiplication value $\gamma \times r_R$ of the normalized inner product value $r_R$ and the left-right correlation coefficient γ is a target of coding in the right channel subtraction gain estimation unit 140 and decoding in the right channel subtraction gain decoding unit 250, and the right channel subtraction gain code Cβ represents the quantized value of the multiplication value $\gamma \times r_R$, the right channel subtraction gain estimation unit 140 and the right channel subtraction gain decoding unit 250 may multiply the quantized value of the multiplication value $\gamma \times r_R$ by the right channel correction coefficient $c_R$ to obtain the right channel subtraction gain β.

First Embodiment

A coding device and a decoding device according to a first embodiment will be described.

Coding Device 101

Figure 10:
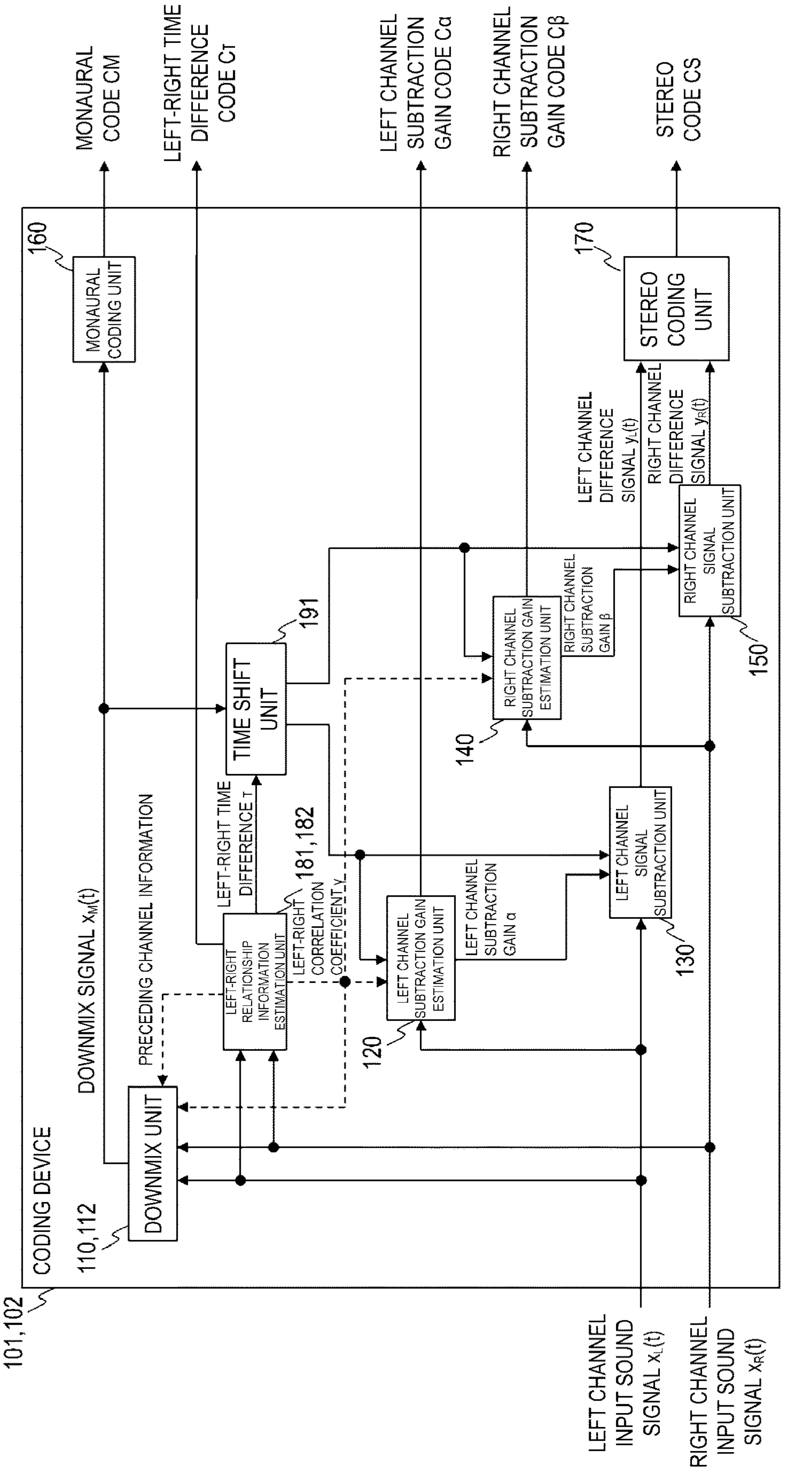
FIG. 10 is a block diagram illustrating an example of a coding device according to a first embodiment and a second embodiment.
Figure 11:
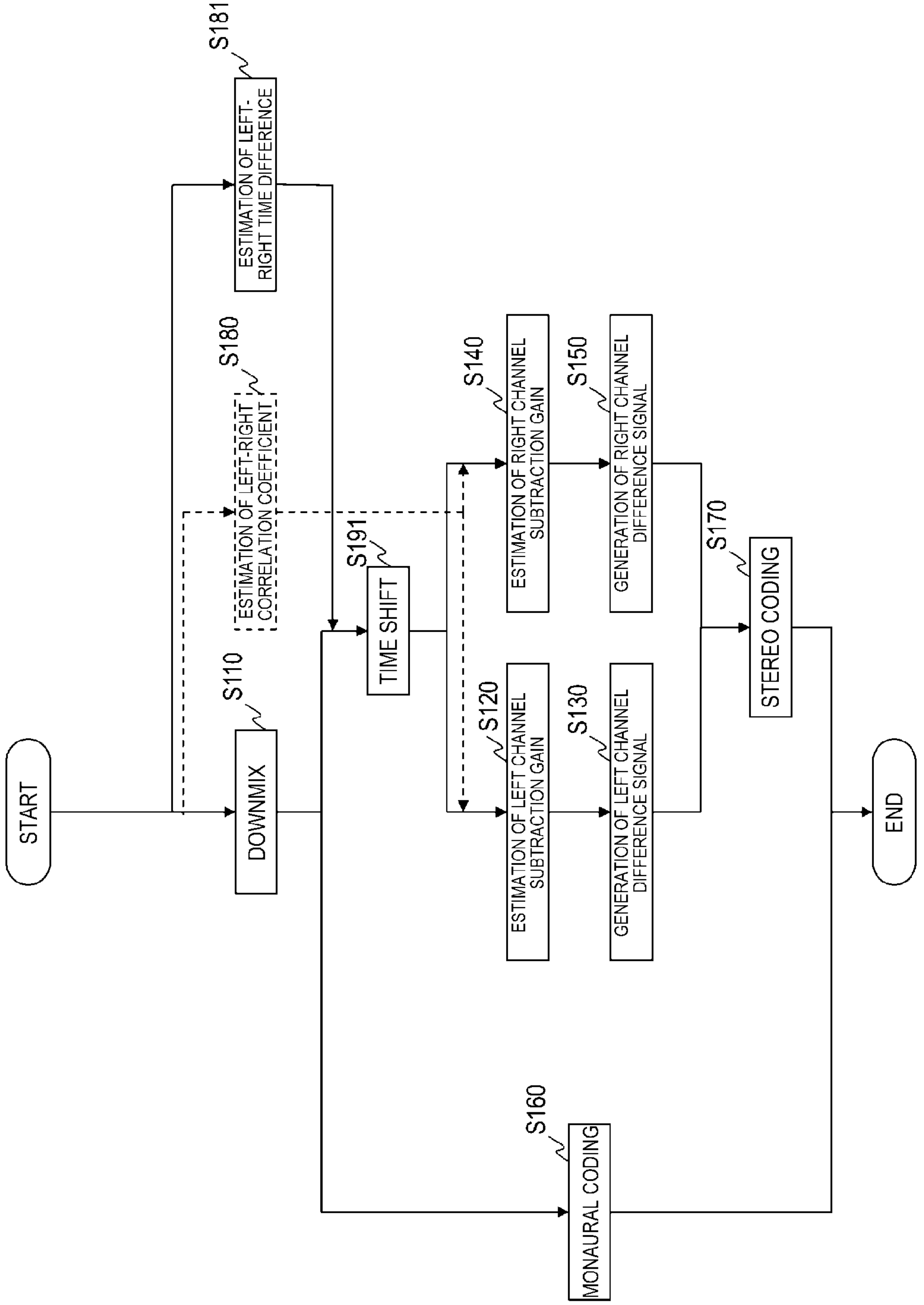
FIG. 11 is a flowchart illustrating an example of processing of the coding device according to the first embodiment.

As illustrated in FIG. 10, a coding device 101 according to the first embodiment includes a downmix unit 110, a left channel subtraction gain estimation unit 120, a left channel signal subtraction unit 130, a right channel subtraction gain estimation unit 140, a right channel signal subtraction unit 150, a monaural coding unit 160, a stereo coding unit 170, a left-right relationship information estimation unit 181, and a time shift unit 191. The coding device 101 according to the first embodiment is different from the coding device 100 according to the reference embodiment in that the coding device 101 according to the first embodiment includes the left-right relationship information estimation unit 181 and the time shift unit 191, signals output by the time shift unit 191 instead of the signals output by the downmix unit 110 are used by the left channel subtraction gain estimation unit 120, the left channel signal subtraction unit 130, the right channel subtraction gain estimation unit 140, and the right channel signal subtraction unit 150, and the coding device 101 according to the first embodiment outputs the left-right time difference code Cτ described later in addition to the above-mentioned codes. The other configurations and operations of the coding device 101 according to the first embodiment are the same as the coding device 100 according to the reference embodiment. The coding device 101 according to the first embodiment performs the processes of steps S110 to S191 illustrated in FIG. 11 for each frame. The differences of the coding device 101 according to the first embodiment from the coding device 100 according to the reference embodiment will be described below.

Left-Right Relationship Information Estimation Unit 181

The input sound signals of the left channel input to the coding device 101 and the input sound signals of the right channel input to the coding device 101 are input to the left-right relationship information estimation unit 181. The left-right relationship information estimation unit 181 obtains and outputs a left-right time difference $\tau$ and a left-right time difference code $C\tau$, which is the code representing the left-right time difference $\tau$, from the input sound signals of the left channel and the input sound signals of the right channel input (step S181).

Assuming that sound signals obtained by AD conversion of sounds collected by the microphone for the left channel disposed in a certain space are the input sound signals of the left channel, and sound signals obtained by AD conversion of sounds collected by the microphone for the right channel disposed in the certain space are the input sound signals of the right channel, the left-right time difference $\tau$ is information corresponding to the difference (so-called time difference of arrival) between the arrival time from the sound source that mainly emits sound in the space to the microphone for the left channel and the arrival time from the sound source to the microphone for the right channel. Note that, in order to include not only the time difference of arrival, but also the information on which microphone sound has reached earlier in the left-right time difference $\tau$, the left-right time difference $\tau$ can take a positive value or a negative value, based on the input sound signals of one of the sides. In other words, the left-right time difference $\tau$ is information indicating how far ahead the same sound signal is included in the input sound signals of the left channel or the input sound signals of the right channel. In the following, in a case where the same sound signal is included in the input sound signals of the left channel before the input sound signals of the right channel, it is also said that the left channel is preceding, and in a case where the same sound signal is included in the input sound signals of the right channel before the input sound signals of the left channel, it is also said that the right channel is preceding.

The left-right time difference $\tau$ may be determined by any known method. For example, the left-right relationship information estimation unit 181 calculates a value $\gamma_{cand}$ representing the magnitude of the correlation (hereinafter referred to as a correlation value) between a sample sequence of the input sound signals of the left channel and a sample sequence of the input sound signals of the right channel at a position shifted to a later position than that of the sample sequence by the number of candidate samples $\tau_{cand}$ for each number of candidate samples $\tau_{cand}$ from the predetermined $\tau_{max}$ to $\tau_{min}$ (e.g., $\tau_{max}$ is a positive number and $\tau_{min}$ is a negative number), to obtain the number of candidate samples $\tau_{cand}$ at which the correlation value $\gamma_{cand}$ is maximized, as the left-right time difference $\tau$. In other words, in this example, in the case where the left channel is preceding, the left-right time difference $\tau$ is a positive value, in the case where the right channel is preceding, the left-right time difference $\tau$ is a negative value, and the absolute value of the left-right time difference $\tau$ is the value representing how far the preceding channel precedes the other channel (the number of samples preceding). For example, in a case where the correlation value $\gamma_{cand}$ is calculated using only the samples in the frame, if $\tau_{cand}$ is a positive value, the absolute value of the correlation coefficient between a partial sample sequence $x_R(1+\tau_{cand})$, $x_R(2\ \tau_{cand})$, . . . , $x_R(T)$ of the input sound signals of the right channel and a partial sample sequence $x_L(1)$, $x_L(2)$, . . . , $x_L(T-\tau_{cand})$ of the input sound signals of the left channel at a position shifted before the partial sample sequence by the number of candidate samples of $\tau_{cand}$ is calculated as the correlation value $\gamma_{cand}$, and if $\tau_{cand}$ is a negative value, the absolute value of the correlation coefficient between a partial sample sequence $x_L(1-\tau_{cand})$, $x_L(2-\tau_{cand})$, . . . , $x_L(T)$ of the input sound signals of the left channel and a partial sample sequences $x_R(1)$, $x_R(2)$, . . . , $x_R(T+\tau_{cand})$ of the input sound signals of the right channel at a position shifted before the partial sample sequence by the number of candidate samples $-\tau_{cand}$ is calculated as the correlation value $\gamma_{cand}$. Of course, one or more samples of past input sound signals that are continuous with the sample sequence of the input sound signals of the current frame may also be used to calculate the correlation value $\gamma_{cand}$, and in this case, the sample sequence of the input sound signals of the past frames only needs to be stored in a storage unit (not illustrated) in the left-right relationship information estimation unit 181 for a predetermined number of frames.

For example, instead of the absolute value of the correlation coefficient, the correlation value $\gamma_{cand}$ may be calculated by using the information on the phases of the signals as described below. In this example, the left-right relationship information estimation unit 181 first performs Fourier transform on each of the input sound signals $x_L(1)$, $x_L(2)$, . . . , $x_L(T)$ of the left channel and the input sound signals $x_R(1)$, $x_R(2)$, . . . , $x_R(T)$ of the right channel as in Equations (3-1) and (3-2) below to obtain the frequency spectra $X_L(k)$ and $X_R(k)$ at each frequency k from 0 to T−1.

[Math. 19]

$$X_L(k) = \frac{1}{\sqrt{T}} \sum_{t=0}^{T-1} x_L(t+1) e^{-j\frac{2\pi kt}{T}} \tag{3-1}$$

[Math. 20]

$$X_R(k) = \frac{1}{\sqrt{T}} \sum_{t=0}^{T-1} x_R(t+1) e^{-j\frac{2\pi kt}{T}} \tag{3-2}$$

The left-right relationship information estimation unit 181 obtains the spectrum $\varphi(k)$ of the phase difference at each frequency k by Equation (3-3) below using the obtained frequency spectra $X_L(k)$ and $X_R(k)$.

[Math. 21]

$$\phi(k) = \frac{X_L(k)/|X_L(k)|}{X_R(k)/|X_R(k)|} \tag{3-3}$$

The obtained spectrum of the phase difference is inverse Fourier transformed to obtain a phase difference signal $\psi(\tau_{cand})$ for each number of candidate samples $\tau_{cand}$ from $\tau_{max}$ to $\tau_{min}$ as in Equation (3-4) below.

[Math. 22]

$$\psi(\tau_{cand}) = \frac{1}{\sqrt{T}}\sum_{k=0}^{T-1}\phi(k)e^{j\frac{2\pi k\tau_{cand}}{T}} \tag{3-4}$$

Because the absolute value of the obtained phase difference signal $\psi(\tau_{cand})$ represents a certain correlation corresponding to the plausibility of the time difference between the input sound signals $x_L(1), x_L(2), \ldots, x_L(T)$ of the left channel and the input sound signals $x_R(1), x_R(2), \ldots, x_R(T)$ of the right channel, the absolute value of this phase difference signal $\psi(\tau_{cand})$ for each number of candidate samples $\tau_{cand}$ is used as the correlation value $\gamma_{cand}$. The left-right relationship information estimation unit 181 obtains the number of candidate samples $\tau_{cand}$ at which the correlation value $\gamma_{cand}$, which is the absolute value of the phase difference signal $\psi(\tau_{cand})$, is maximized, as the left-right time difference $\tau$. Note that instead of using the absolute value of the phase difference signal $\psi(\tau_{cand})$ as the correlation value $\gamma_{cand}$ as it is, a normalized value such as, for example, the relative difference from the average of the absolute values of the phase difference signals obtained for each of the plurality of the numbers of candidate samples $\tau_{cand}$ before and after the absolute value of the phase difference signal $\psi(\tau_{cand})$ for each $\tau_{cand}$ may be used. In other words, the average value may be obtained by Equation (3-5) below using a predetermined positive number $\tau_{range}$ for each $\tau_{cand}$, and the normalized correlation value obtained by Expression (3-6) below using the obtained average value $\psi_c(\tau_{cand})$ and the phase difference signal $\psi(\tau_{cand})$ may be used as the $\gamma_{cand}$.

[Math. 23]

$$\psi_c(\tau_{cand}) = \frac{1}{2\tau_{range}|1}\sum_{\tau'=\tau_{cand}-\tau_{range}}^{\tau_{cand}|\tau_{range}}|\psi(\tau')| \tag{3-5}$$

[Math. 24]

$$1 - \frac{\psi_c(\tau_{cand})}{|\psi(\tau_{cand})|} \tag{3-6}$$

Note that the normalized correlation value obtained by Expression (3-6) is a value of 0 or greater and 1 or less, and is a value indicating a property where the normalized correlation value is close to 1 as $\tau_{cand}$ is plausible as the left-right time difference, and the normalized correlation value is close to 0 as $\tau_{cand}$ is not plausible as the left-right time difference.

The left-right relationship information estimation unit 181 only needs to code the left-right time difference $\tau$ in a prescribed coding scheme to obtain a left-right time difference code $C\tau$ that is a code capable of uniquely identifying the left-right time difference $\tau$. Known coding schemes such as scalar quantization is used as the prescribed coding scheme. Note that each of the predetermined numbers of candidate samples may be each of integer values from $\tau_{max}$ to $\tau_{min}$, or may include fractions and decimals between $\tau_{max}$ and $\tau_{min}$, but need not necessarily include any integer value between $\tau_{max}$ and $\tau_{min}$. $\tau_{max}=-\tau_{min}$ may but need not necessarily be the case. In a case of targeting special input sound signals in which any channel always precedes, both $\tau_{max}$ and $\tau_{min}$ may be positive numbers, or both $\tau_{max}$ and $\tau_{min}$ may be negative numbers.

Note that, in a case where the coding device 101 estimates the subtraction gain based on the principle for minimizing the quantization errors of Example 4 or the modified example of Example 4 described in the reference embodiment, the left-right relationship information estimation unit 181 further outputs the correlation value between the sample sequence of the input sound signals of the left channel and the sample sequence of the input sound signals of the right channel at a position shifted to a later position than that of the sample sequence by the left-right time difference $\tau$, that is, the maximum value of the correlation values $\gamma_{cand}$ calculated for each number of candidate samples $\tau_{cand}$ from $\tau_{max}$ to $\tau_{min}$, as the left-right correlation coefficient $\gamma$ (step S180).

Time Shift Unit 191

The downmix signals $x_M(1), x_M(2), \ldots, x_M(T)$ output by the downmix unit 110 and the left-right time difference $\tau$ output by the left-right relationship information estimation unit 181 are input into the time shift unit 191. In a case where the left-right time difference $\tau$ is a positive value (i.e., in a case where the left-right time difference $\tau$ indicates that the left channel is preceding), the time shift unit 191 outputs the downmix signals $x_M(1), x_M(2), \ldots, x_M(T)$ to the left channel subtraction gain estimation unit 120 and the left channel signal subtraction unit 130 as is (i.e., determined to be used in the left channel subtraction gain estimation unit 120 and the left channel signal subtraction unit 130), and outputs delayed downmix signals $x_{M'}(1), x_{M'}(2), \ldots$ m $x_{M'}(T)$ which are signals $x_M(1-|\tau|), x_M(2-|\tau|), \ldots, x_M(T-|\tau|)$ obtained by delaying the downmix signals by $|\tau|$ samples (the number of samples in the absolute value of the left-right time difference $\tau$, the number of samples for the magnitude represented by the left-right time difference $\tau$) to the right channel subtraction gain estimation unit 140 and the right channel signal subtraction unit 150 (i.e., determined to be used in the right channel subtraction gain estimation unit 140 and the right channel signal subtraction unit 150). In a case where the left-right time difference $\tau$ is a negative value (i.e., in a case where the left-right time difference $\tau$ indicates that the right channel is preceding), the time shift unit 191 outputs delayed downmix signals $x_{M'}(1), x_{M'}(2), \ldots, x_{M'}(T)$ which are signals $x_M(1-|\tau|), x_M(2-|\tau|), \ldots, x_M(T-|\tau|)$ obtained by delaying the downmix signals by $|\tau|$ samples to the left channel subtraction gain estimation unit 120 and the left channel signal subtraction unit 130 (i.e., determined to be used in the left channel subtraction gain estimation unit 120 and the left channel signal subtraction unit 130), and outputs the downmix signals $x_M(1), x_M(2), \ldots, x_M(T)$ to the right channel subtraction gain estimation unit 140 and the right channel signal subtraction unit 150 as is (i.e., determined to be used in the right channel subtraction gain estimation unit 140 and the right channel signal subtraction unit 150). In a case where the left-right time difference $\tau$ is 0 (i.e., in a case where the left-right time difference $\tau$ indicates that none of the channels is preceding), the time shift unit 191 outputs the downmix signals $x_M(1), x_M(2), \ldots, x_M(T)$ to the left channel subtraction gain estimation unit 120, the left channel signal subtraction unit 130, the right channel subtraction gain estimation unit 140, and the right channel signal subtraction unit 150 as is (i.e., determined to be used in the left channel subtraction gain estimation unit 120, the left channel signal subtraction unit 130, the right channel subtraction gain estimation unit 140, and the right channel signal subtraction unit 150) (step S191). In other words, for the channel with the shorter arrival time described above of the left channel and the right channel, the input downmix signals are output as is to the subtraction gain estimation unit of the channel and the signal subtraction unit of the channel, and for the channel with the longer arrival time of the left channel and the right channel, signals obtained by delaying the input downmix signals by the absolute value $|\tau|$ of the left-right time difference $\tau$ are output to the subtraction gain estimation unit of the channel and the signal subtraction unit of the channel. Note that because the downmix signals of the past frames are used in the time shift unit 191 to obtain the delayed downmix signals, the storage unit (not illustrated) in the time shift unit 191 stores the downmix signals input in the past frames for a predetermined number of frames. In a case where the left channel subtraction gain estimation unit 120 and the right channel subtraction gain estimation unit 140 obtain the left channel subtraction gain $\alpha$ and the right channel subtraction gain $\beta$ in a well-known method such as that illustrated in PTL 1 rather than the method based on the principle for minimizing quantization errors, a means for obtaining a local decoded signal corresponding to the monaural code CM may be provided in the subsequent stage of the monaural coding unit 160 of the coding device 101 or in the monaural coding unit 160, and in the time shift unit 191, the processing described above may be performed by using the quantized downmix signals $\hat{x}_M(1), \hat{x}_M(2), \ldots, \hat{x}_M(T)$ which are local decoded signals for monaural coding in place of the downmix signals $x_M(1), x_M(2), \ldots, x_M(T)$. In this case, the time shift unit 191 outputs the quantized downmix signals $\hat{x}_M(1), \hat{x}_M(2), \ldots, \hat{x}_M(T)$ instead of the downmix signals $x_M(1), x_M(2), \ldots, x_M(T)$, and outputs delayed quantized downmix signals $\hat{x}_M(1), \hat{x}_M(2), \ldots, \hat{x}_M(T)$ instead of the delayed downmix signals $x_M(1), x_M(2), \ldots, x_M(T)$.

Left Channel Subtraction Gain Estimation Unit 120, Left Channel Signal Subtraction Unit 130, Right Channel Subtraction Gain Estimation Unit 140, and Right Channel Signal Subtraction Unit 150

The left channel subtraction gain estimation unit 120, the left channel signal subtraction unit 130, the right channel subtraction gain estimation unit 140, and the right channel signal subtraction unit 150 perform the same operations as those described in the reference embodiment, by using the downmix signals $x_M(1), x_M(2), \ldots, x_M(T)$ or the delayed downmix signals $x_M(1), x_M(2), \ldots, x_M(T)$ input from the time shift unit 191, instead of the downmix signals $x_M(1), x_M(2), \ldots, x_M(T)$ output by the downmix unit 110 (steps S120, S130, S140, and S150). In other words, the left channel subtraction gain estimation unit 120, the left channel signal subtraction unit 130, the right channel subtraction gain estimation unit 140, and the right channel signal subtraction unit 150 perform the same operations as those described in the reference embodiment, by using the downmix signals $x_M(1), x_M(2), \ldots, x_M(T)$ or the delayed downmix signals $x_M(1), x_M(2), \ldots, x_M(T)$ determined by the time shift unit 191. Note that, in the case where the time shift unit 191 outputs the quantized downmix signals $\hat{x}_M(1), \hat{x}_M(2), \ldots, \hat{x}_M(T)$ instead of the downmix signals $x_M(1), x_M(2), \ldots, x_M(T)$, and outputs delayed quantized downmix signals $\hat{x}_M(1), \hat{x}_M(2), \ldots, \hat{x}_M(T)$ instead of the delayed downmix signals $x_M(1), x_M(2), \ldots, x_M(T)$, the left channel subtraction gain estimation unit 120, the left channel signal subtraction unit 130, the right channel subtraction gain estimation unit 140, and the right channel signal subtraction unit 150 performs the processing described above by using the quantized downmix signals $\hat{x}_M(1), \hat{x}_M(2), \ldots, \hat{x}_M(T)$ or the delayed quantized downmix signals $\hat{x}_M(1), \hat{x}_M(2), \ldots, \hat{x}_M(T)$ input from the time shift unit 191.

Decoding Device 201

Figure 12:
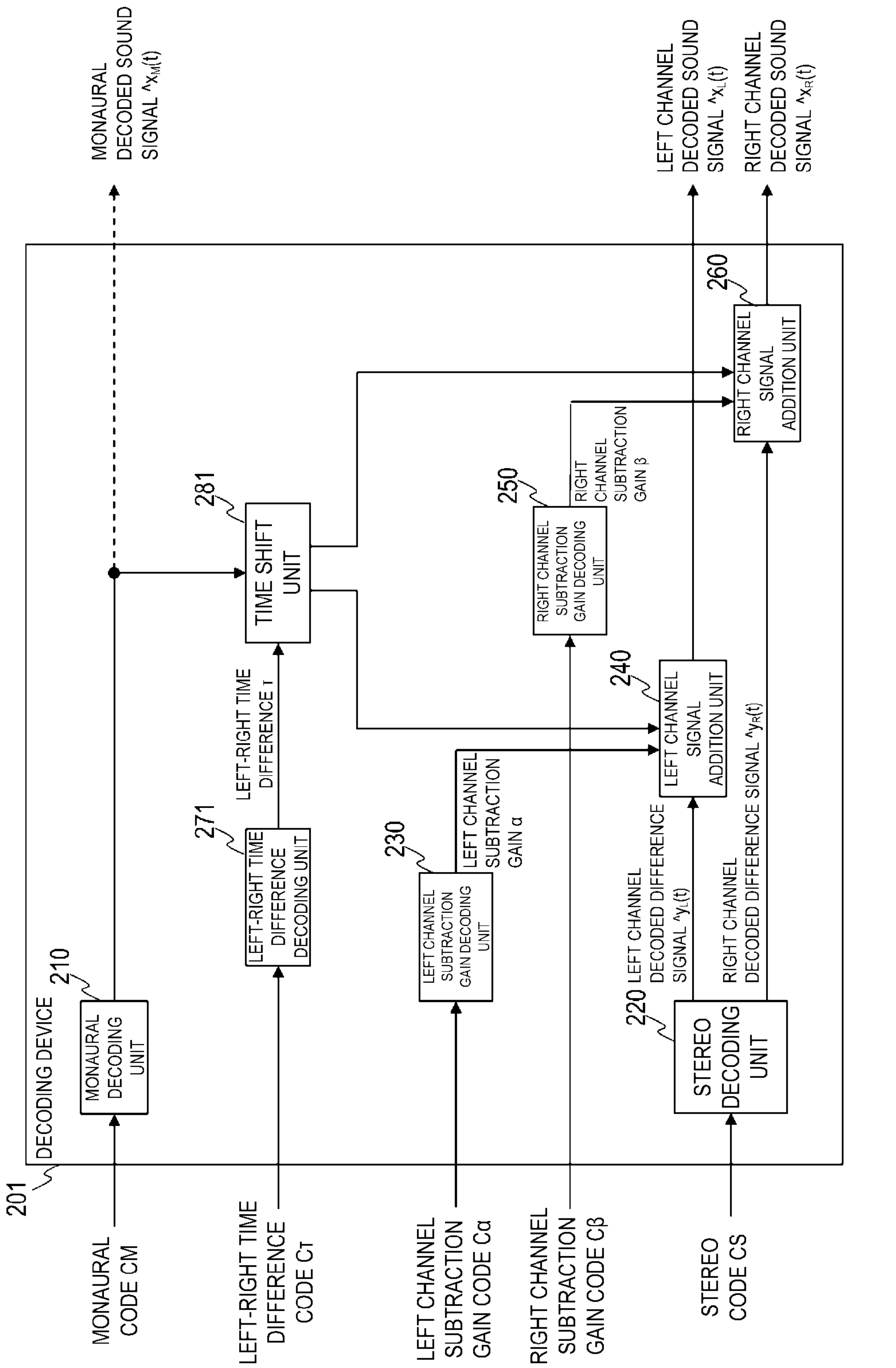
FIG. 12 is a block diagram illustrating an example of a decoding device according to the first embodiment.
Figure 13:
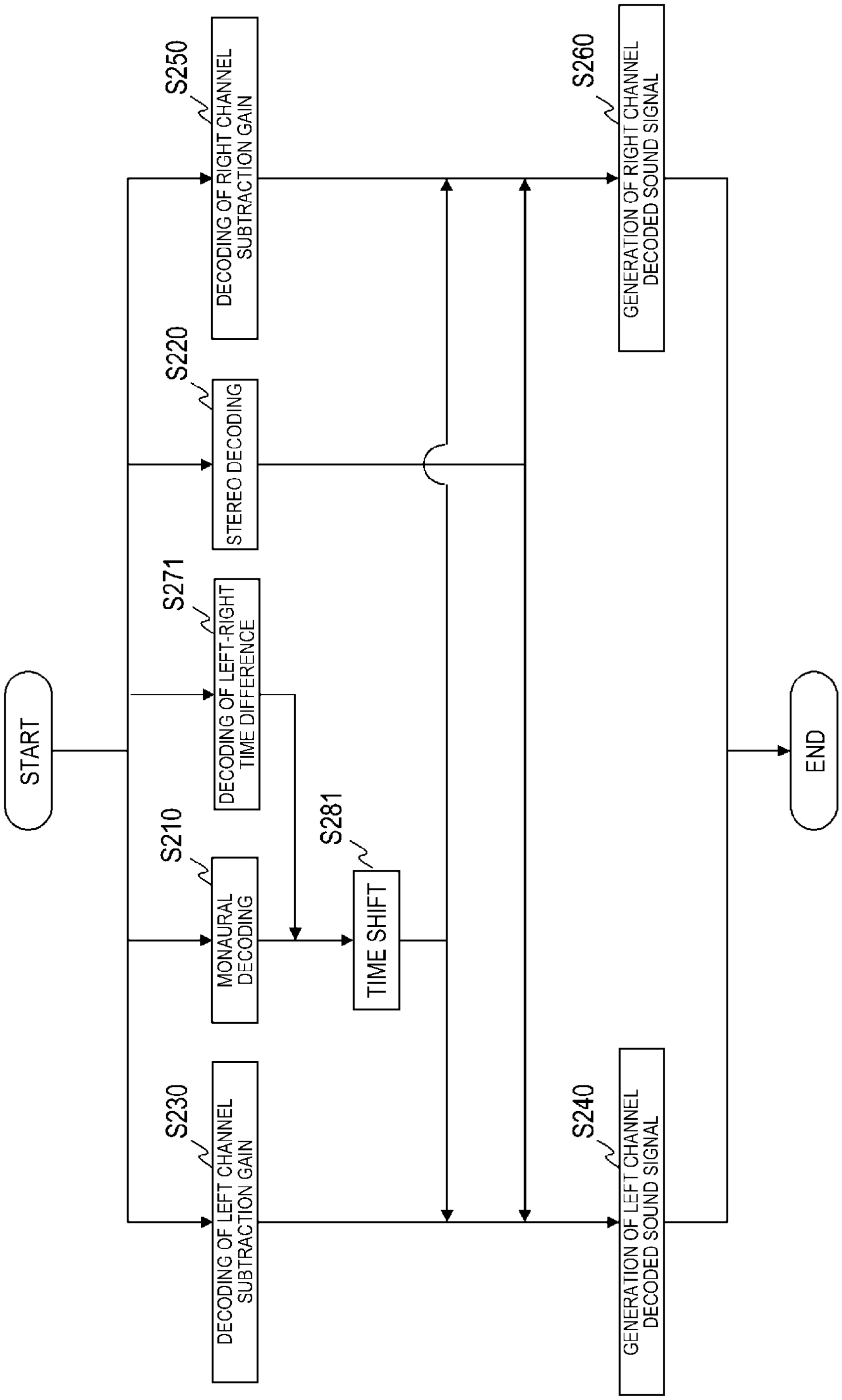
FIG. 13 is a flowchart illustrating an example of processing of the decoding device according to the first embodiment.

As illustrated in FIG. 12, the decoding device 201 according to the first embodiment includes a monaural decoding unit 210, a stereo decoding unit 220, a left channel subtraction gain decoding unit 230, a left channel signal addition unit 240, a right channel subtraction gain decoding unit 250, a right channel signal addition unit 260, a left-right time difference decoding unit 271, and a time shift unit 281. The decoding device 201 according to the first embodiment is different from the decoding device 200 according to the reference embodiment in that the left-right time difference code $C\tau$ described later is input in addition to each of the above-mentioned codes, the decoding device 201 according to the first embodiment includes the left-right time difference decoding unit 271 and the time shift unit 281, and signals output by the time shift unit 281 instead of the signals output by the monaural decoding unit 210 are used by the left channel signal addition unit 240 and the right channel signal addition unit 260. The other configurations and operations of the decoding device 201 according to the first embodiment are the same as those of the decoding device 200 according to the reference embodiment. The decoding device 201 according to the first embodiment performs the processes of step S210 to step S281 illustrated in FIG. 13 for each frame. The differences of the decoding device 201 according to the first embodiment from the decoding device 200 according to the reference embodiment will be described below.

Left-Right Time Difference Decoding Unit 271

The left-right time difference code $C\tau$ input to the decoding device 201 is input to the left-right time difference decoding unit 271. The left-right time difference decoding unit 271 decodes the left-right time difference code $C\tau$ in a prescribed decoding scheme to obtain and output the left-right time difference $\tau$ (step S271). A decoding scheme corresponding to the coding scheme used by the left-right relationship information estimation unit 181 of the corresponding coding device 101 is used as the prescribed decoding scheme. The left-right time difference $\tau$ obtained by the left-right time difference decoding unit 271 is the same value as the left-right time difference $\tau$ obtained by the left-right relationship information estimation unit 181 of the corresponding coding device 101, and is any value within a range from $\tau_{max}$ to $\tau_{min}$.

Time Shift Unit 281

The monaural decoded sound signals $\hat{x}_M(1), \hat{x}_M(2), \ldots, \hat{x}_M(T)$ output by the monaural decoding unit 210 and the left-right time difference $\tau$ output by the left-right time difference decoding unit 271 are input to the time shift unit 281. In a case where the left-right time difference $\tau$ is a positive value (i.e., in a case where the left-right time difference $\tau$ indicates that the left channel is preceding), the time shift unit 281 outputs the monaural decoded sound signals $\hat{x}_M(1), \hat{x}_M(2), \ldots, \hat{x}_M(T)$ to the left channel signal addition unit 240 as is (i.e., determined to be used in the left channel signal addition unit 240), and outputs delayed monaural decoded sound signals $\hat{x}_M(1), \hat{x}_M(2), \ldots, \hat{x}_M(T)$ which are signals $\hat{x}_M(1-|\tau|), \hat{x}_M(2-|\tau|), \ldots, \hat{x}_M(T-|\tau|)$ obtained by delaying the monaural decoded sound signals by $|\tau|$ samples, to the right channel signal addition unit 260 (i.e., determined to be used in the right channel signal addition unit 260). In a case where the left-right time difference $\tau$ is a negative value (i.e., in a case where the left-right time difference $\tau$ indicates that the right channel is preceding), the time shift unit 281 outputs delayed monaural decoded sound signals $\hat{x}_M(1), \hat{x}_M(2), \ldots, \hat{x}_M(T)$ which are signals $\hat{x}_M(1-|\tau|), \hat{x}_M(2-$

|τ|), . . . , $\hat{x}_M(T-|\tau|)$ obtained by delaying the monaural decoded sound signals by |τ| samples to the left channel signal addition unit 240 (i.e., determined to be used in the left channel signal addition unit 240), and outputs the monaural decoded sound signals $\hat{x}_M(1), \hat{x}_M(2), \ldots, \hat{x}_M(T)$ to the right channel signal addition unit 260 as is (i.e., determined to be used in the right channel signal addition unit 260). In a case where the left-right time difference τ is 0 (i.e., in a case where the left-right time difference τ indicates that none of the channels is preceding), the time shift unit 281 outputs the monaural decoded sound signals $\hat{x}_M(1), \hat{x}_M(2), \ldots, \hat{x}_M(T)$ to the left channel signal addition unit 240 and the right channel signal addition unit 260 as is (i.e., determined to be used in the left channel signal addition unit 240 and the right channel signal addition unit 260) (step S281). Note that because the monaural decoded sound signals of the past frames are used in the time shift unit 281 to obtain the delayed monaural decoded sound signals, the storage unit (not illustrated) in the time shift unit 281 stores the monaural decoded sound signals input in the past frames for a predetermined number of frames.

Left Channel Signal Addition Unit 240 and Right Channel Signal Addition Unit 260

The left channel signal addition unit 240 and the right channel signal addition unit 260 perform the same operations as those described in the reference embodiment, by using the monaural decoded sound signals $\hat{x}_M(1), \hat{x}_M(2), \ldots, \hat{x}_M(T)$ or the delayed monaural decoded sound signals $\hat{x}_{M'}(1), \hat{x}_{M'}(2), \ldots, \hat{x}_{M'}(T)$ input from the time shift unit 281, instead of the monaural decoded sound signals $\hat{x}_M(1), \hat{x}_M(2), \ldots, \hat{x}_M(T)$ output by the monaural decoding unit 210 (steps S240 and S260). In other words, the left channel signal addition unit 240 and the right channel signal addition unit 260 perform the same operations as those described in the reference embodiment, by using the monaural decoded sound signals $\hat{x}_M(1), \hat{x}_M(2), \ldots, \hat{x}_M(T)$ or the delayed monaural decoded sound signals $\hat{x}_{M'}(1), \hat{x}_{M'}(2), \ldots, x_{M'}(T)$ determined by the time shift unit 281.

Second Embodiment

The coding device 101 according to the first embodiment may be modified to generate downmix signals in consideration of the relationship between the input sound signals of the left channel and the input sound signals of the right channel, and this embodiment will be described as a second embodiment. Note that the codes obtained by the coding device according to the second embodiment can be decoded by the decoding device 201 according to the first embodiment, and thus description of the decoding device is omitted.

Coding Device 102

Figure 14:
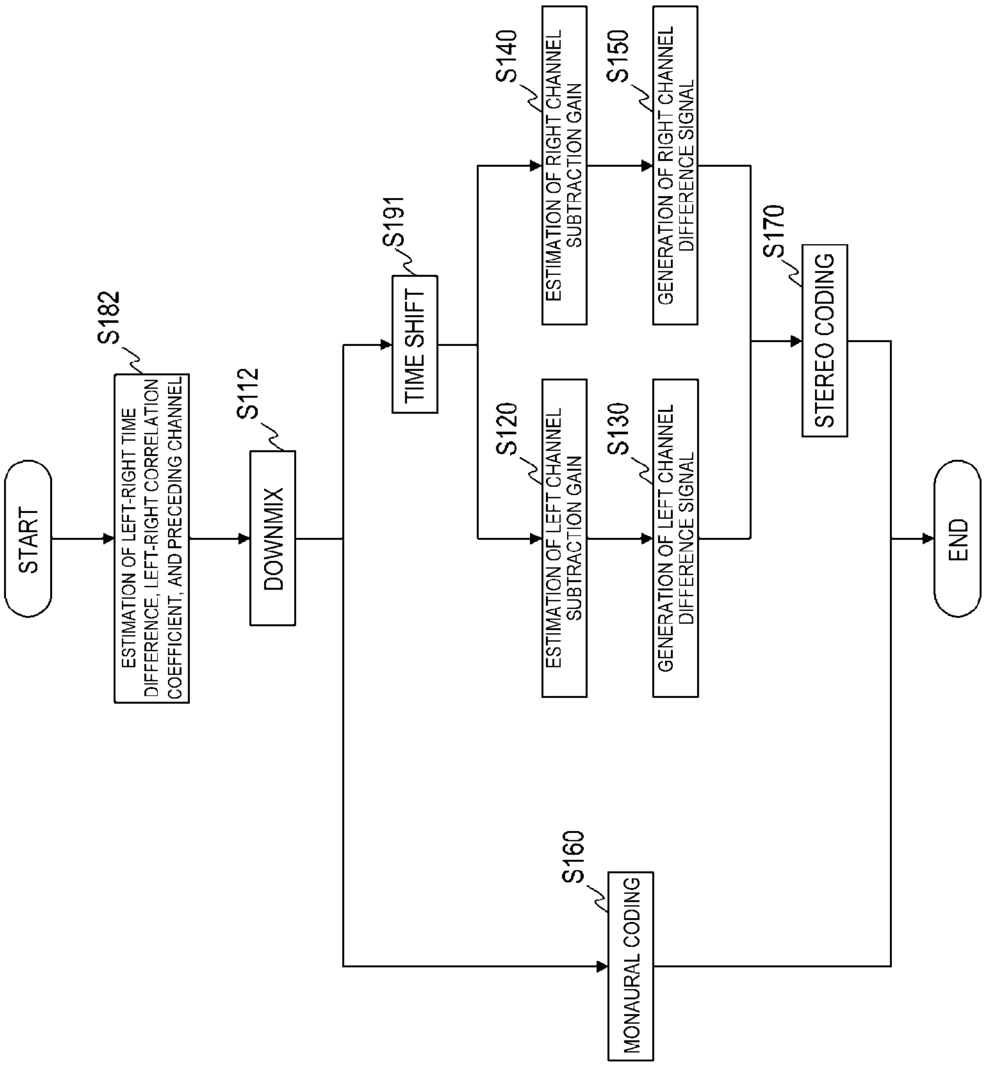
FIG. 14 is a flowchart illustrating an example of processing of the coding device according to the second embodiment.

As illustrated in FIG. 10, a coding device 102 according to the second embodiment includes a downmix unit 112, a left channel subtraction gain estimation unit 120, a left channel signal subtraction unit 130, a right channel subtraction gain estimation unit 140, a right channel signal subtraction unit 150, a monaural coding unit 160, a stereo coding unit 170, a left-right relationship information estimation unit 182, and a time shift unit 191. The coding device 102 according to the second embodiment is different from the coding device 101 according to the first embodiment in that the coding device 102 according to the second embodiment includes the left-right relationship information estimation unit 182 instead of the left-right relationship information estimation unit 181, the coding device 102 according to the second embodiment includes the downmix unit 112 instead of the downmix unit 110, the left-right relationship information estimation unit 182 obtains and outputs the left-right correlation coefficient γ and the preceding channel information as illustrated by the dashed lines in FIG. 10, and the output left-right correlation coefficient γ and the preceding channel information are input and used in the downmix unit 112. The other configurations and operations of the coding device 102 according to the second embodiment are the same as the coding device 101 according to the first embodiment. The coding device 102 according to the third embodiment performs the processes of step S112 to step S191 illustrated in FIG. 14 for each frame. The differences of the coding device 102 according to the second embodiment from the coding device 101 according to the first embodiment will be described below.

Left-Right Relationship Information Estimation Unit 182

The input sound signals of the left channel input to the coding device 102 and the input sound signals of the right channel input to the coding device 102 are input to the left-right relationship information estimation unit 182. The left-right relationship information estimation unit 182 obtains and outputs a left-right time difference τ, a left-right time difference code Cτ, which is the code representing the left-right time difference τ, a left-right correlation coefficient γ, and preceding channel information, from the input sound signals of the left channel and the input sound signals of the right channel input (step S182). The process in which the left-right relationship information estimation unit 182 obtains the left-right time difference τ and the left-right time difference code Cτ is similar to that of the left-right relationship information estimation unit 181 according to the first embodiment.

The left-right correlation coefficient γ is information corresponding to the correlation coefficient between the sound signals reaching the microphone for the left channel from the sound source and collected and the sound signals reaching the microphone for the right channel from the sound source and collected, in the above-mentioned assumption in the description of the left-right relationship information estimation unit 181 according to the first embodiment. The preceding channel information is information corresponding to which microphone the sound emitted by the sound source reaches earlier, is information indicating in which of the input sound signals of the left channel and the input sound signals of the right channel the same sound signal is included earlier, and is information indicating which channel of the left channel and the right channel is preceding.

In the case of the example described above in the description of the left-right relationship information estimation unit 181 according to the first embodiment, the left-right relationship information estimation unit 182 obtains and outputs the correlation value between the sample sequence of the input sound signals of the left channel and the sample sequence of the input sound signals of the right channel at a position shifted to a later position than that of the sample sequence by the left-right time difference τ, that is, the maximum value of the correlation values $\gamma_{cand}$ calculated for each number of candidate samples $\tau_{cand}$ from $\tau_{max}$ to $\tau_{min}$, as the left-right correlation coefficient γ. In a case where the left-right time difference τ is a positive value, the left-right relationship information estimation unit 182 obtains and outputs information indicating that the left channel is preceding as the preceding channel information, and in a case where the left-right time difference τ is a negative value, the left-right relationship information estimation unit 182 obtains and outputs information indicating that the right channel is preceding as the preceding channel information. In a case where the left-right time difference τ is 0, the left-right relationship information estimation unit 182 may obtain and output information indicating that the left channel is preceding as the preceding channel information, may obtain and output information indicating that the right channel is preceding as the preceding channel information, or may obtain and output information indicating that none of the channels is preceding as the preceding channel information.

Downmix Unit 112

The input sound signals of the left channel input to the coding device 102, the input sound signals of the right channel input to the coding device 102, the left-right correlation coefficient γ output by the left-right relationship information estimation unit 182, and the preceding channel information output by the left-right relationship information estimation unit 182 are input to the downmix unit 112. The downmix unit 112 obtains and outputs the downmix signals by weighted averaging the input sound signals of the left channel and the input sound signals of the right channel such that the downmix signals include a larger amount of the input sound signals of the preceding channel of the input sound signals of the left channel and the input sound signals of the right channel as the left-right correlation coefficient γ is greater (step S112).

For example, if an absolute value or a normalized value of the correlation coefficient is used for the correlation value as in the example described above in the description of the left-right relationship information estimation unit 181 according to the first embodiment, the obtained left-right correlation coefficient γ is a value of 0 or greater and 1 or less, and thus the downmix unit 112 uses a signal obtained by weighted addition of the input sound signal $x_L(t)$ of the left channel and the input sound signal $x_R(t)$ of the right channel by using the weight determined by the left-right correlation coefficient γ for each corresponding sample number t, as the downmix signal $x_M(t)$. Specifically, in the case where the preceding channel information is information indicating that the left channel is preceding, that is, in the case where the left channel is preceding, the downmix unit 112 obtains the downmix signal $x_M(t)$ as $x_M(t)=((1+\gamma)/2)\times x_L(t)+((1-\gamma)/2)\times x_R(t)$, and in the case where the preceding channel information is information indicating that the right channel is preceding, that is, in the case where the right channel is preceding, the downmix unit 112 obtains the downmix signal $x_M(t)$ as $x_M(t)=((1-\gamma)/2)\times x_L(t)+((1+\gamma)/2)\times x_R(t)$. By the downmix unit 112 obtaining the downmix signal in this way, the downmix signal is closer to the signal obtained by the average of the input sound signals of the left channel and the input sound signals of the right channel, as the left-right correlation coefficient γ is smaller, that is, the correlation between the input sound signals of the left channel and the input sound signals of the right channel is smaller, and the downmix signal is closer to the input sound signal of the preceding channel of the input sound signals of the left channel and the input sound signals of the right channel, as the left-right correlation coefficient γ is greater, that is, the correlation between the input sound signals of the left channel and the input sound signals of the right channel is greater.

Note that in the case where none of the channels is preceding, the downmix unit 112 may obtain and output the downmix signals by averaging the input sound signals of the left channel and the input sound signals of the right channel such that the input sound signals of the left channel and the input sound signals of the right channel are included in the downmix signals with the same weight. Thus, in the case where the preceding channel information indicates that none of the channels is preceding, then the downmix unit 112 uses $x_M(t)=(x_L(t)+x_R(t))/2$ obtained by averaging the input sound signal $x_L(t)$ of the left channel and the input sound signal $x_R(t)$ of the right channel for each sample number t as the downmix signal $x_M(t)$.

Program and Recording Medium

Figure 15:
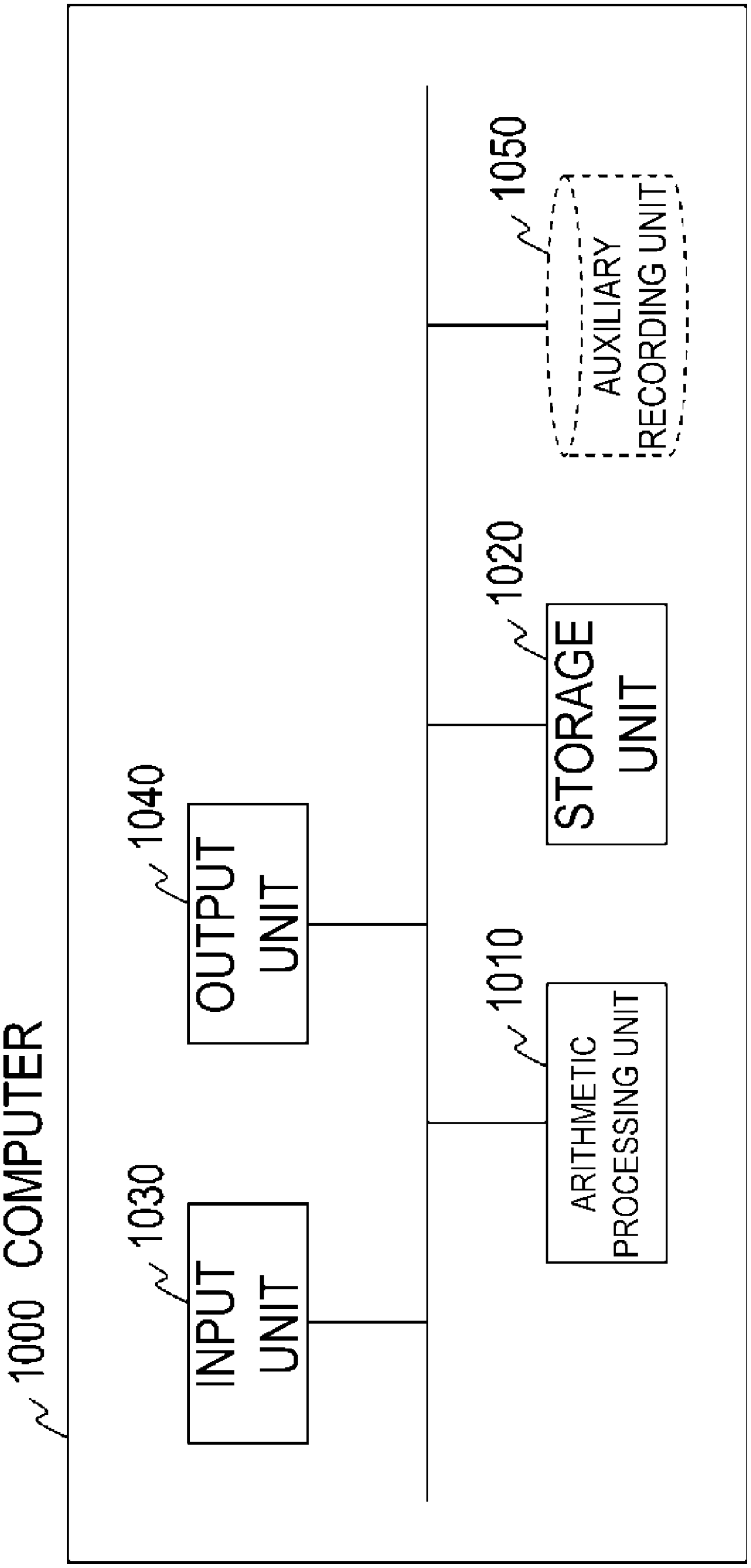
FIG. 15 is a diagram illustrating an example of a functional configuration of a computer realizing each device according to an embodiment of the present disclosure.

The processing of each unit of each coding device and each decoding device described above may be realized by computers, and in this case, the processing contents of the functions that each device should have are described by programs. Then, by causing this program to be read into a storage unit 1020 of the computer illustrated in FIG. 15 and causing an arithmetic processing unit 1010, an input unit 1030, an output unit 1040, and the like to operate, various processing functions of each of the devices described above are implemented on the computer.

A program in which processing content thereof has been described can be recorded on a computer-readable recording medium. The computer-readable recording medium is, for example, a non-temporary recording medium, specifically, a magnetic recording device, an optical disk, or the like.

Distribution of this program is performed, for example, by selling, transferring, or renting a portable recording medium such as a DVD or CD-ROM on which the program has been recorded. Further, the program may be distributed by being stored in a storage device of a server computer and transferred from the server computer to another computer via a network.

For example, a computer executing such a program first temporarily stores the program recorded on the portable recording medium or the program transmitted from the server computer in an auxiliary recording unit 1050 that is its own non-temporary storage device. Then, when executing the processing, the computer reads the program stored in the auxiliary recording unit 1050 that is its own storage device to the storage unit 1020 and executes the processing in accordance with the read program. As another execution mode of this program, the computer may directly read the program from the portable recording medium to the storage unit 1020 and execute processing in accordance with the program, or, further, may sequentially execute the processing in accordance with the received program each time the program is transferred from the server computer to the computer. A configuration in which the above-described processing is executed by a so-called application service provider (ASP) type service for realizing a processing function according to only an execution instruction and result acquisition without transferring the program from the server computer to the computer may be adopted. It is assumed that the program in the present embodiment includes information provided for processing of an electronic calculator and being pursuant to the program (such as data that is not a direct command to the computer, but has properties defining processing of the computer).

In this embodiment, although the present device is configured by a prescribed program being executed on the computer, at least a part of processing content of thereof may be realized by hardware.

It is needless to say that the present disclosure can appropriately be modified without departing from the gist of the present disclosure.

The invention claimed is:

1. A sound signal coding method for coding an input sound signal on a frame-by-frame basis, the sound signal coding method comprising:

obtaining a downmix signal that is a signal obtained by mixing a left channel input sound signal that is input and a right channel input sound signal that is input;

obtaining a monaural code CM by coding the downmix signal;

obtaining a left-right time difference τ and a left-right time difference code Cτ that is a code representing the left-right time difference τ, from the left channel input sound signal and the right channel input sound signal;

determining including in a case where the left-right time difference τ indicates that a left channel is preceding, deciding to use the downmix signal as is in obtaining of a left channel subtraction gain α and a left channel subtraction gain code Cα and obtaining of a sequence of values as a left channel difference signal, and deciding to use a delayed downmix signal that is a signal obtained by delaying the downmix signal by a magnitude represented by the left-right time difference τ in obtaining of a right channel subtraction gain β and a right channel subtraction gain code Cβ and obtaining of a sequence of values as a right channel difference signal, in a case where the left-right time difference τ indicates that a right channel is preceding, deciding to use the downmix signal as is in the obtaining of the right channel subtraction gain β and the right channel subtraction gain code Cβ and the obtaining of the sequence of values as the right channel difference signal, and deciding to use a delayed downmix signal that is a signal obtained by delaying the downmix signal by a magnitude represented by the left-right time difference τ in the obtaining of the left channel subtraction gain α and the left channel subtraction gain code Cα and the obtaining of the sequence of values as the left channel difference signal, and in a case where the left-right time difference τ indicates that neither the left channel nor the right channel is preceding, deciding to use the downmix signal as is in the obtaining of the left channel subtraction gain α and the left channel subtraction gain code Cα, the obtaining of the sequence of values as the left channel difference signal, the obtaining of the right channel subtraction gain β and the right channel subtraction gain code Cβ, and the obtaining of the sequence of values as the right channel difference signal;

the obtaining the left channel subtraction gain α and the left channel subtraction gain code Cα that is a code representing the left channel subtraction gain α, from the left channel input sound signal, and the downmix signal or the delayed downmix signal decided by the determining;

the obtaining the sequence of values obtained by subtracting a value obtained by multiplying a sample value of the downmix signal or the delayed downmix signal decided by the determining and the left channel subtraction gain α, from a sample value of the left channel input sound signal, per corresponding sample t, as the left channel difference signal;

the obtaining the right channel subtraction gain β and the right channel subtraction gain code Cβ that is a code representing the right channel subtraction gain β, from the right channel input sound signal, and the downmix signal or the delayed downmix signal decided by the determining;

the obtaining the sequence of values obtained by subtracting a value obtained by multiplying a sample value of the downmix signal or the delayed downmix signal decided by the determining and the right channel subtraction gain β, from a sample value of the right channel input sound signal, per corresponding sample t, as the right channel difference signal; and obtaining a stereo code CS by coding the left channel difference signal and the right channel difference signal.

2. A sound signal coding method for coding an input sound signal on a frame-by-frame basis, the sound signal coding method comprising:

obtaining a downmix signal that is a signal obtained by mixing a left channel input sound signal that is input and a right channel input sound signal that is input;

obtaining a monaural code CM and a quantized downmix signal by coding the downmix signal;

obtaining a left-right time difference τ and a left-right time difference code Ct that is a code representing the left-right time difference τ, from the left channel input sound signal and the right channel input sound signal;

determining including in a case where the left-right time difference τ indicates that a left channel is preceding, deciding to use the quantized downmix signal as is in obtaining of a left channel subtraction gain α and a left channel subtraction gain code Cα and obtaining of a sequence of values as a left channel difference signal, and deciding to use a delayed quantized downmix signal that is a signal obtained by delaying the quantized downmix signal by a magnitude represented by the left-right time difference τ in obtaining of a right channel subtraction gain β and a right channel subtraction gain code Cβ and obtaining of a sequence of values as a right channel difference signal, in a case where the left-right time difference τ indicates that a right channel is preceding, deciding to use the quantized downmix signal as is in the obtaining of the right channel subtraction gain β and the right channel subtraction gain code Cβ and the obtaining of the sequence of values as the right channel difference signal, and deciding to use a delayed quantized downmix signal that is a signal obtained by delaying the quantized downmix signal by a magnitude represented by the left-right time difference τ in the obtaining of the left channel subtraction gain α and the left channel subtraction gain code Cα and the obtaining of the sequence of values as the left channel difference signal, and in a case where the left-right time difference τ indicates that neither the left channel nor the right channel is preceding, deciding to use the quantized downmix signal as is in the obtaining of the left channel subtraction gain α and the left channel subtraction gain code Cα, the obtaining of the sequence of values as the left channel difference signal, the obtaining of the right channel subtraction gain β and the right channel subtraction gain code Cβ, and the obtaining of the sequence of values as the right channel difference signal;

the obtaining the left channel subtraction gain α and the left channel subtraction gain code Cα that is a code representing the left channel subtraction gain «, from the left channel input sound signal, and the quantized downmix signal or the delayed quantized downmix signal decided by the determining;

the obtaining the sequence of values obtained by subtracting a value obtained by multiplying a sample value of the quantized downmix signal or the delayed quantized downmix signal decided by the determining and the left channel subtraction gain α, from a sample value of the left channel input sound signal, per corresponding sample t, as the left channel difference signal;

the obtaining the right channel subtraction gain β and the right channel subtraction gain code Cβ that is a code representing the right channel subtraction gain β, from the right channel input sound signal, and the quantized downmix signal or the delayed quantized downmix signal decided by the determining;

the obtaining the sequence of values obtained by subtracting a value obtained by multiplying a sample value of the quantized downmix signal or the delayed quantized downmix signal decided by the determining and the right channel subtraction gain β, from a sample value of the right channel input sound signal, per corresponding sample t, as the right channel difference signal; and obtaining a stereo code CS by coding the left channel difference signal and the right channel difference signal.

3. The sound signal coding method according to claim 1, further comprising obtaining preceding channel information that is information indicating which of the left channel input sound signal and the right channel input sound signal is preceding and a left-right correlation coefficient that is a correlation coefficient between the left channel input sound signal and the right channel input sound signal, wherein in the obtaining of the downmix signal, the downmix signal is obtained by weighted averaging the left channel input sound signal and the right channel input sound signal to include a larger amount of the input sound signal of a preceding channel among the left channel input sound signal and the right channel input sound signal as the left-right correlation coefficient is greater, based on the preceding channel information and the left-right correlation coefficient.

4. A sound signal decoding method for obtaining a sound signal by decoding an input code on a frame-by-frame basis, the sound signal decoding method comprising:

obtaining a monaural decoded sound signal by decoding a monaural code CM that is input;

obtaining a left channel decoded difference signal and a right channel decoded difference signal by decoding a stereo code CS that is input;

obtaining a left-right time difference τ from a left-right time difference code Cτ that is input;

determining including in a case where the left-right time difference τ indicates that a left channel is preceding, deciding to use the monaural decoded sound signal as is in obtaining of a sequence of values as a left channel decoded sound signal, and deciding to use a delayed monaural decoded sound signal that is a signal obtained by delaying the monaural decoded sound signal by a magnitude represented by the left-right time difference τ in obtaining of a sequence of values as a right channel decoded sound signal, in a case where the left-right time difference τ indicates that a right channel is preceding, deciding to use the monaural decoded sound signal as is in the obtaining of the sequence of values as the right channel decoded sound signal, and deciding to use a delayed monaural decoded sound signal that is a signal obtained by delaying the monaural decoded sound signal by a magnitude represented by the left-right time difference τ in the obtaining of the sequence of values as the left channel decoded sound signal, and in a case where the left-right time difference τ indicates that neither the left channel nor the right channel is preceding, deciding to use the monaural decoded sound signal as is in the obtaining of the sequence of values as the left channel decoded sound signal and the obtaining of the sequence of values as the right channel decoded sound signal;

obtaining a left channel subtraction gain α by decoding a left channel subtraction gain code Cα that is input;

the obtaining the sequence of values obtained by adding a sample value of the left channel decoded difference signal and a value obtained by multiplying a sample value of the monaural decoded sound signal or the delayed monaural decoded sound signal decided by the determining and the left channel subtraction gain α, per corresponding sample t, as the left channel decoded sound signal;

obtaining a right channel subtraction gain β by decoding a right channel subtraction gain code Cβ that is input; and the obtaining the sequence of values obtained by adding a sample value of the right channel decoded difference signal and a value obtained by multiplying a sample value of the monaural decoded sound signal or the delayed monaural decoded sound signal decided by the determining and the right channel subtraction gain β, per corresponding sample t, as the right channel decoded sound signal.

5. A sound signal coding device configured to code an input sound signal on a frame-by-frame basis, the sound signal coding device comprising:

a downmix unit configured to obtain a downmix signal that is a signal obtained by mixing a left channel input sound signal that is input and a right channel input sound signal that is input;

a monaural coding unit configured to obtain a monaural code CM by coding the downmix signal;

a left-right relationship estimation unit configured to obtain a left-right time difference τ and a left-right time difference code Cτ that is a code representing the left-right time difference τ, from the left channel input sound signal and the right channel input sound signal;

a time shift unit configured to in a case where the left-right time difference τ indicates that a left channel is preceding, decide to use the downmix signal as is in a left channel subtraction gain estimation unit and a left channel signal subtraction unit, and decide to use a delayed downmix signal that is a signal obtained by delaying the downmix signal by a magnitude represented by the left-right time difference τ in a right channel subtraction gain estimation unit and a right channel signal subtraction unit, in a case where the left-right time difference τ indicates that a right channel is preceding, decide to use the downmix signal as is in the right channel subtraction gain estimation unit and the right channel signal subtraction unit, and decide to use a delayed downmix signal that is a signal obtained by delaying the downmix signal by a magnitude represented by the left-right time difference τ in the left channel subtraction gain estimation unit and the left channel signal subtraction unit, and in a case where the left-right time difference τ indicates that neither the left channel nor the right channel is preceding, decide to use the downmix signal as is in the left channel subtraction gain estimation unit, the left channel signal subtraction unit, the right channel subtraction gain estimation unit, and the right channel signal subtraction unit;

the left channel subtraction gain estimation unit configured to obtain a left channel subtraction gain α and a left channel subtraction gain code Cα that is a code representing the left channel subtraction gain α, from the left channel input sound signal, and the downmix signal or the delayed downmix signal decided by the time shift unit;

the left channel signal subtraction unit configured to obtain a sequence of values obtained by subtracting a value obtained by multiplying a sample value of the downmix signal or the delayed downmix signal decided by the time shift unit and the left channel subtraction gain α, from a sample value of the left channel input sound signal, per corresponding sample t, as a left channel difference signal;

the right channel subtraction gain estimation unit configured to obtain a right channel subtraction gain β and a right channel subtraction gain code Cβ that is a code representing the right channel subtraction gain β, from the right channel input sound signal, and the downmix signal or the delayed downmix signal decided by the time shift unit;

the right channel signal subtraction unit configured to obtain a sequence of values obtained by subtracting a value obtained by multiplying a sample value of the downmix signal or the delayed downmix signal decided by the time shift unit and the right channel subtraction gain β, from a sample value of the right channel input sound signal, per corresponding sample t, as a right channel difference signal; and a stereo coding unit configured to obtain a stereo code CS by coding the left channel difference signal and the right channel difference signal.

6. A sound signal coding device configured to code an input sound signal on a frame-by-frame basis, the sound signal coding device comprising:

a downmix unit configured to obtain a downmix signal that is a signal obtained by mixing a left channel input sound signal that is input and a right channel input sound signal that is input;

a monaural coding unit configured to obtain a monaural code CM and a quantized downmix signal by coding the downmix signal;

a left-right relationship estimation unit configured to obtain a left-right time difference τ and a left-right time difference code Cτ that is a code representing the left-right time difference τ, from the left channel input sound signal and the right channel input sound signal;

a time shift unit configured to in a case where the left-right time difference τ indicates that a left channel is preceding, decide to use the quantized downmix signal as is in a left channel subtraction gain estimation unit and a left channel signal subtraction unit, and decide to use a delayed quantized downmix signal that is a signal obtained by delaying the quantized downmix signal by a magnitude represented by the left-right time difference τ in a right channel subtraction gain estimation unit and a right channel signal subtraction unit, in a case where the left-right time difference τ indicates that a right channel is preceding, decide to use the quantized downmix signal as is in the right channel subtraction gain estimation unit and the right channel signal subtraction unit, and decide to use a delayed quantized downmix signal that is a signal obtained by delaying the quantized downmix signal by a magnitude represented by the left-right time difference τ in the left channel subtraction gain estimation unit and the left channel signal subtraction unit, and in a case where the left-right time difference τ indicates that neither the left channel nor the right channel is preceding, decide to use the quantized downmix signal as is in the left channel subtraction gain estimation unit, the left channel signal subtraction unit, the right channel subtraction gain estimation unit, and the right channel signal subtraction unit;

the left channel subtraction gain estimation unit configured to obtain a left channel subtraction gain α and a left channel subtraction gain code Cα that is a code representing the left channel subtraction gain α, from the left channel input sound signal, and the quantized downmix signal or the delayed quantized downmix signal decided by the time shift unit;

the left channel signal subtraction unit configured to obtain a sequence of values obtained by subtracting a value obtained by multiplying a sample value of the quantized downmix signal or the delayed quantized downmix signal decided by the time shift unit and the left channel subtraction gain α, from a sample value of the left channel input sound signal, per corresponding sample t, as a left channel difference signal;

the right channel subtraction gain estimation unit configured to obtain a right channel subtraction gain β and a right channel subtraction gain code Cβ that is a code representing the right channel subtraction gain β, from the right channel input sound signal, and the quantized downmix signal or the delayed quantized downmix signal decided by the time shift unit;

the right channel signal subtraction unit configured to obtain a sequence of values obtained by subtracting a value obtained by multiplying a sample value of the quantized downmix signal or the delayed quantized downmix signal decided by the time shift unit and the right channel subtraction gain β, from a sample value of the right channel input sound signal, per corresponding sample t, as a right channel difference signal; and a stereo coding unit configured to obtain a stereo code CS by coding the left channel difference signal and the right channel difference signal.

7. A sound signal decoding device configured to obtain a sound signal by decoding an input code on a frame-by-frame basis, the sound signal decoding device comprising:

a monaural decoding unit configured to obtain a monaural decoded sound signal by decoding a monaural code CM that is input;

a stereo decoding unit configured to obtain a left channel decoded difference signal and a right channel decoded difference signal by decoding a stereo code CS that is input;

a left-right time difference decoding unit configured to obtain a left-right time difference τ from a left-right time difference code Cτ that is input;

a time shift unit configured to in a case where the left-right time difference τ indicates that a left channel is preceding, decide to use the monaural decoded sound signal as is in a left channel signal addition unit, and decide to use a delayed monaural decoded sound signal that is a signal obtained by delaying the monaural decoded sound signal by a magnitude represented by the left-right time difference τ in a right channel signal addition unit, in a case where the left-right time difference τ indicates that a right channel is preceding, decide to use the monaural decoded sound signal as is in the right channel signal addition unit, and decide to use a delayed monaural decoded sound signal that is a signal obtained by delaying the monaural decoded sound signal by a magnitude represented by the left-right time difference τ in the left channel signal addition unit, and in a case where the left-right time difference τ indicates that neither the left channel nor the right channel is preceding, decide to use the monaural decoded sound signal as is in the left channel signal addition unit and the right channel signal addition unit;

a left channel subtraction gain decoding unit configured to obtain a left channel subtraction gain α by decoding a left channel subtraction gain code Cα that is input;

the left channel signal addition unit configured to obtain a sequence of values obtained by adding a sample value of the left channel decoded difference signal and a value obtained by multiplying a sample value of the monaural decoded sound signal or the delayed monaural decoded sound signal decided by the time shift unit and the left channel subtraction gain α, per corresponding sample t, as a left channel decoded sound signal;

a right channel subtraction gain decoding unit configured to obtain a right channel subtraction gain β by decoding a right channel subtraction gain code Cβ that is input; and the right channel signal addition unit configured to obtain a sequence of values obtained by adding a sample value of the right channel decoded difference signal and a value obtained by multiplying a sample value of the monaural decoded sound signal or the delayed monaural decoded sound signal decided by the time shift unit and the right channel subtraction gain β, per corresponding sample t, as a right channel decoded sound signal.

8. A non-transitory computer-readable recording medium for recording a program for causing a computer to execute steps of the coding method according to claim 1.

9. A non-transitory computer-readable recording medium for recording a program for causing a computer to execute steps of the decoding method according to claim 4.

10. A non-transitory computer-readable recording medium for recording a program for causing a computer to execute steps of the coding method according to claim 2.

* * * * *